United States Patent
Su et al.

(10) Patent No.: US 11,940,992 B2
(45) Date of Patent: Mar. 26, 2024

(54) MODEL FILE MANAGEMENT METHOD AND TERMINAL DEVICE

(71) Applicant: Huawei Technologies Co., Ltd., Shenzhen (CN)

(72) Inventors: Qing Su, Beijing (CN); Junyuan Yang, Shenzhen (CN); Wenshuai Yin, Shenzhen (CN); Yue Gu, Shenzhen (CN); Ke Wan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 379 days.

(21) Appl. No.: 17/284,898

(22) PCT Filed: Nov. 1, 2019

(86) PCT No.: PCT/CN2019/115166
§ 371 (c)(1),
(2) Date: Apr. 13, 2021

(87) PCT Pub. No.: WO2020/088681
PCT Pub. Date: May 7, 2020

(65) Prior Publication Data
US 2021/0390092 A1 Dec. 16, 2021

(30) Foreign Application Priority Data

Nov. 1, 2018 (CN) .......................... 201811298105.4
Apr. 24, 2019 (CN) .......................... 201910336055.2

(51) Int. Cl.
*G06F 16/23* (2019.01)
*H04L 67/06* (2022.01)
(Continued)

(52) U.S. Cl.
CPC .......... *G06F 16/2379* (2019.01); *H04L 67/06* (2013.01); *G06F 8/61* (2013.01); *H04L 67/34* (2013.01)

(58) Field of Classification Search
CPC ...... G06F 16/2379; H04L 67/06; H04L 67/34
See application file for complete search history.

(56) References Cited

U.S. PATENT DOCUMENTS 9,557,969 B2 * 1/2017 Sharma .................... G06F 8/35
9,684,688 B2 * 6/2017 Ferguson ............... G06V 10/95
(Continued)

FOREIGN PATENT DOCUMENTS

| CN | 101957753 A | 1/2011 |
|---|---|---|
| CN | 103631626 A | 3/2014 |

(Continued)

OTHER PUBLICATIONS

Anonymous: "Deploy API—API and SOK I Mendix Documentation", Nov. 24, 2017, 17 pages, XP055822211, https://docs.mendix.com/apidocs-mxsdk/apidocs/deploy-api.

*Primary Examiner* — Huawen A Peng
(74) *Attorney, Agent, or Firm* — Conley Rose, P.C.

(57) ABSTRACT

A model file management method includes that a terminal device receives a storage address of a target model file package from a server and the terminal device obtains the target model file package based on the storage address of the target model file package, where the target model file package is based on a parameter of a model file package locally stored in the terminal device and a parameter of a model file package managed by the server. In an artificial intelligence (AI) field, an application may implement a specific function by using an AI model file. An application (Continued)

is decoupled from an AI model file such that the terminal device performs centralized management on a general model file.

20 Claims, 13 Drawing Sheets

(51) Int. Cl.
*G06F 8/61* (2018.01)
*H04L 67/00* (2022.01)

(56) References Cited

U.S. PATENT DOCUMENTS

| | | | |
|---|---|---|---|
| 2007/0294357 A1 | 12/2007 | Antoine | |
| 2011/0283257 A1 | 11/2011 | Charisius et al. | |
| 2012/0216201 A1* | 8/2012 | Aghajanyan | H04L 67/1097 718/100 |
| 2012/0259964 A1 | 10/2012 | Lin et al. | |
| 2014/0204799 A1* | 7/2014 | Pietrowicz | H04L 41/22 370/254 |
| 2016/0234625 A1 | 8/2016 | Wang et al. | |
| 2016/0313989 A1* | 10/2016 | Chen | G06F 8/654 |
| 2016/0373526 A1 | 12/2016 | Obata et al. | |
| 2017/0069314 A1 | 3/2017 | Mun | |

FOREIGN PATENT DOCUMENTS

| | | |
|---|---|---|
| CN | 104657170 A | 5/2015 |
| CN | 104683409 A | 6/2015 |
| CN | 105119944 A | 12/2015 |
| CN | 106254467 A | 12/2016 |
| CN | 106569844 A | 4/2017 |
| CN | 106708537 A | 5/2017 |
| CN | 108073350 A | 5/2018 |
| CN | 108074210 A | 5/2018 |
| CN | 108573453 A | 9/2018 |
| JP | 2017524183 A | 8/2017 |
| TW | 201241665 A | 10/2012 |
| WO | 2016004062 A1 | 1/2016 |
| WO | 2018064047 A1 | 4/2018 |

* cited by examiner

MODEL FILE MANAGEMENT METHOD AND TERMINAL DEVICE

CROSS-REFERENCE TO RELATED APPLICATIONS

This application is a U.S. National Stage of International Patent Application No. PCT/CN2019/115166 filed on Nov. 1, 2019, which claims priority to Chinese Patent Application No. 201910336055.2 filed on Apr. 24, 2019 and Chinese Patent Application No. 201811298105.4 filed on Nov. 1, 2018. All of the aforementioned applications are hereby incorporated by reference in their entireties.

This application claims priority to Chinese Patent Application No. 201811298105.4, filed with the Chinese Patent Office on Nov. 1, 2018 and Chinese Patent Application No. 201910336055.2, filed with the Chinese Patent Office on Apr. 24, 2019, which are incorporated herein by reference in their entireties.

TECHNICAL FIELD

Embodiments of this application relate to the field of communications technologies, and in particular, to a model file management method and a terminal device.

BACKGROUND

With popularization and application of an intelligent terminal, a large number of computer applications (Apps) for resolving life and work problems are developed. The app runs in hardware and software environments of the intelligent terminal. In addition, with continuous development of artificial intelligence (Artificial Intelligence, AI) technologies, deep learning increasingly becomes a mature and reliable method in the AI field. In a deep learning algorithm, a deep network structure is constructed, and network parameters are trained. These network parameters are saved in model files in different formats on different platforms. These model files are increasingly used in apps to implement specific functions.

Currently, the model files are usually packaged into an app file package. When the app or the model file needs to be changed, the entire app file package needs be changed. However, the model file is usually large. Consequently, the app file package is large and terminal resources are wasted.

Embodiments of this application provide a model file management method and a terminal device, to reduce redundant storage of a model file in the terminal device, and save resources of the terminal device.

According to a first aspect, an embodiment of this application provides a model file management method, including: A terminal device receives a storage address of a target model file package from a server; and obtains the target model file package based on the storage address of the target model file package. The target model file package is determined based on a parameter of a model file package locally stored in the terminal device and a parameter of a model file package managed by the server.

In a possible design, before the terminal device receives the storage address of the target model file package from the server, the method further includes: The terminal device obtains a parameter of the target model file package: and sends a first request to the server based on the parameter of the target model file package. The first request is used to request the target model file package.

In a possible design, that the terminal device obtains a parameter of the target model file package includes: The terminal device receives parameters that are of K model file packages and that are sent by the server, where K is a positive integer; and determines the parameter of the target model file package from the parameters of the K model file packages based on the parameter of the locally stored model file package.

In a possible design, the parameter of the target model file package includes an identifier of the target model file package, the first request includes the identifier of the target model file package, and the Identifier of the target model file package is used by the server to obtain the storage address of the target model file package.

In a possible design, the parameter of the model file package includes a first-type parameter and a second-type parameter, and a matching priority of the first-type parameter is higher than a matching priority of the second-type parameter. That the terminal device determines the parameter of the target model file package from the parameters of the K model file packages based on the parameter of the locally stored model file package includes: When a first-type parameter of the locally stored model file package matches first-type parameters of N model file packages in the K model file packages, the terminal device determines the parameter of the target model file package based on a second-type parameter of the locally stored model file package and second-type parameters of the N model file packages, where N is a positive integer less than or equal to K.

In a possible design, the second-type parameter includes a plurality of sub-parameters, and each sub-parameter has a different matching priority. That the terminal device determines the parameter of the target model file package based on a second-type parameter of the locally stored model file package and second-type parameters of the N model file packages includes: The terminal device matches the second-type parameter of the locally stored model file package with the second-type parameters of the N model file packages based on a matching priority sequence of the sub-parameters, to determine the parameter of the target model file package.

In a possible design, before the terminal device receives the storage address of the target model file package from the server, the method further includes: The terminal device obtains a parameter of a target model file; if the terminal device does not find the target model file in a locally stored model file based on the parameter of the target model file, the terminal device obtains, based on the parameter of the target model file, a parameter of a model file package to which the target model file belongs: and the terminal device sends a second request to the server. The second request includes the parameter of the model file package to which the target model file belongs, and the parameter of the model file package to which the target model file belongs is used by the server to determine the storage address of the target model file package.

In a possible design, before the terminal device receives the storage address of the target model file package from the server, the method further includes: The terminal device sends the parameter of the locally stored model file package to the server. The parameter of the locally stored model file package is used by the server to determine the storage address of the target model file package.

In a possible design, that the terminal device sends the parameter of the locally stored model file package to the server includes: The terminal device receives a third request sent by the server; and the terminal device sends the parameter of the locally stored model file package to the server based on the third request; or the terminal device sends the parameter of the locally stored model file package to the server when determining that a condition for sending a parameter of a model file package is met.

According to a second aspect, an embodiment of this application provides a model file management method, including: A server obtains a storage address of a target model file package; and sends the storage address of the target model file package to a terminal device. The storage address is used by the terminal device to obtain the target model file package. The target model file package is determined based on a parameter of a model file package locally stored in the terminal device and a parameter of a model file package managed by the server.

In a possible design, before the server obtains the storage address of the target model file package, the method further includes: The server receives a first request sent by the terminal device. The first request is used to request the target model file package.

In a possible design, before the server receives the first request sent by the terminal device, the method further includes: The server sends parameters of K model file packages managed by the server to the terminal device, where K is a positive integer. The parameters of the K model file packages are used by the terminal device to determine a parameter of the target, model file package from the parameters of the K model file packages.

In a possible design, the parameter of the target model file package includes an identifier of the target model file package, and the first request includes the identifier of the target model file package. That a server obtains a storage address of a target model file package includes: The server obtains the storage address of the target model file package based on the identifier of the target model file package.

In a possible design, before the server obtains the storage address of the target model file package, the method further includes: The server receives a second request sent by the terminal device. The second request includes a parameter of a model file package to which a target model file belongs. That a server obtains a storage address of a target model file package includes: The server determines, based on the parameter of the model file package to which the target model file belongs, a parameter of the target file package from parameters of K model file packages managed by the server; and the server obtains the storage address of the target model file package based on the parameter of the target file package.

In a possible design, before the server obtains the storage address of the target model file package, the method further includes: The server receives the parameter that is of the model file package locally stored in the terminal device and that is sent by the terminal device. That a server obtains a storage address of a target model file package includes: The server determines, based on the parameter of the locally stored model file package, a parameter of the target file package from parameters of K model file packages managed by the server; and the server obtains the storage address of the target model file package based on the parameter of the target file package.

In a possible design, before the server receives the parameter that is of the model file package locally stored in the terminal device and that is sent by the terminal device, the method further includes: The server sends a third request to the terminal device. The third request is used to request the parameter of the model file package locally stored in the terminal device.

In a possible design, the parameter of the model file package includes a first-type parameter and a second-type parameter, and a matching priority of the first-type parameter is higher than a matching priority of the second-type parameter. That the server determines a parameter of the target model file package from parameters of K model file packages based on the parameter of the model file package that is received from the terminal device includes: When a first-type parameter that is of the model file package and that is received from the terminal device matches first-type parameters of N model file packages in the K model file packages, the server determines the parameter of the target model file package based on a second-type parameter that is of the model file package and that is received from the terminal device and second-type parameters of the N model file packages, where N is a positive integer less than or equal to K.

In a possible design, the second-type parameter includes a plurality of sub-parameters, and each sub-parameter has a different matching priority. That the server determines the parameter of the target mode) file package based on a second-type parameter that is of the model file package and that is received from the terminal device and second-type parameters of the N model file packages includes: The server matches the second-type parameter that is of the model file package and that is received from the terminal device with the second-type parameters of the N model file packages based on a matching priority sequence of the sub-parameters, to determine the parameter of the target model file package.

According to a third aspect, an embodiment of this application provides a terminal device, including:

a transceiver module, configured to receive a storage address of a target model file package from a server; and a processing module, configured to obtain the target model file package based on the storage address of the target model file package.

The target model file package is determined based on a parameter of a model file package locally stored in the terminal device and a parameter of a model file package managed by the server.

In a possible design, the processing module is further configured to obtain a parameter of the target model file package before the storage address of the target model file package is received from the server.

The transceiver module is further configured to send a first request to the server based on the parameter of the target model file package, the first request is used to request the target model file package.

In a possible design, the transceiver module is further configured to receive parameters that are of K model file packages and that are sent by the server, where K is a positive integer.

The processing module is specifically configured to determine the parameter of the target model file package from the parameters of the K model file packages based on the parameter of the locally stored model file package.

In a possible design, the parameter of the target model file package includes an identifier of the target model file package, the first request includes the identifier of the target model file package, and the identifier of the target model file package is used by the server to obtain the storage address of the target model file package.

In a possible design, the parameter of the model file package includes a first-type parameter and a second-type parameter, and a matching priority of the first-type parameter is higher than a matching priority of the second-type parameter.

The processing module is specifically configured to: when a first-type parameter of the locally stored model file package matches first-type parameters of N model file packages in the K model file packages, determine the parameter of the target model file package based on a second-type parameter of the locally stored model file package and second-type parameters of the N model file packages, where N is a positive integer less than or equal to K.

In a possible design, the second-type parameter includes a plurality of sub-parameters, and each sub-parameter has a different matching priority. The processing module is specifically configured to match the second-type parameter of the locally stored model file package with the second-type parameters of the N model file packages based on a matching priority sequence of the sub-parameters, to determine the parameter of the target model file package.

In a possible design, the processing module is further configured to: before the transceiver module receives the storage address of the target model file package from the server, obtain a parameter of a target model file: and if the target model file is not found in a locally stored model file based on the parameter of the target model file, obtain, based on the parameter of the target model file, a parameter of a model file package to which the target model file belongs.

The transceiver module is further configured to send a second request to the server. The second request includes the parameter of the model file package to which the target model file belongs, and the parameter of the model file package to which the target model file belongs is used by the server to determine the storage address of the target model file package.

In a possible design, the transceiver module is further configured to send the parameter of the locally stored model file package to the server before receiving the storage address of the target model file package from the server. The parameter of the locally stored model file package is used by the server to determine the storage address of the target model file package.

In a possible design, the transceiver module is specifically configured to: receive a third request sent by the server: and send the parameter of the locally stored model file package to the server based on the third request; or send the parameter of the locally stored model file package to the server when it is determined that a condition for sending a parameter of a model file package is met.

According to a fourth aspect, an embodiment of this application provides a server, including:
a processing module, configured to obtain a storage address of a target model file package; and
a transceiver module, configured to send the storage address of the target model file package to a terminal device. The storage address is used by the terminal device to obtain the target model file package.

The target model file package is determined based on a parameter of a model file package locally stored in the terminal device and a parameter of a model file package managed by the server.

In a possible design, the transceiver module is further configured to: before the processing module obtains the storage address of the target model file package, receive a first request sent by the terminal device. The first request is used to request the target model file package.

In a possible design, the transceiver module is further configured to send parameters of K model file packages managed by the server to the terminal device before receiving the first request sent by the terminal device, where K is a positive integer.

The parameters of the K model file packages are used by the terminal device to determine a parameter of the target model file package from the parameters of the K model file packages.

In a possible design, the parameter of the target model file package includes an identifier of the target model file package, and the first request includes the identifier of the target model file package.

The processing module is specifically configured to obtain the storage address of the target model file package based on the identifier of the target model file package.

In a possible design, the transceiver module is further configured to: before the processing module obtains the storage address of the target model file package, receive a second request sent by the terminal device. The second request includes a parameter of a model file package to which a target model file belongs.

The processing module is specifically configured to: determine, based on the parameter of the model file package to which the target model file belongs, a parameter of the target file package from parameters of K model file packages managed by the server: and obtain the storage address of the target model file package based on the parameter of the target file package.

In a possible design, the transceiver module is further configured to: before the processing module obtains the storage address of the target model file package, receive the parameter that is of the model file package locally stored in the terminal device and that is sent by the terminal device.

The processing module is specifically configured to: determine, based on the parameter of the locally stored model file package, a parameter of the target file package from parameters of K model file packages managed by the server; and obtain the storage address of the target model file package based on the parameter of the target file package.

In a possible design, before receiving the parameter that is of the model file package locally stored in the terminal device and that is sent by the terminal device, the transceiver module is further configured to send a third request to the terminal device. The third request is used to request the parameter of the model file package locally stored in the terminal device.

In a possible design, the parameter of the model file package includes a first-type parameter and a second-type parameter, and a matching priority of the first-type parameter is higher than a matching priority of the second-type parameter.

The processing module is specifically configured to: when a first-type parameter that is of the model file package and that is received from the terminal device matches first-type parameters of N model file packages in the K model file packages, determine the parameter of the target model file package based on a second-type parameter that is of the model file package and that is received from the terminal device and second-type parameters of the N model file packages, where N is a positive integer less than or equal to K.

In a possible design, the second-type parameter includes a plurality of sub-parameters, and each sub-parameter has a different matching priority. The processing module is specifically configured to match the second-type parameter that is of the model file package and that is received from the terminal device with the second-type parameters of the N model file packages based on a matching priority sequence of the sub-parameters, to determine the parameter of the target model file package.

According to a fifth aspect, an embodiment of this application provides a terminal device, including:
a module, a component, or a circuit configured to implement the model file management method according to the first aspect.

According to a sixth aspect, an embodiment of this application provides a server, including:
a module, a component, or a circuit configured to implement the model file management method according to the first aspect.

According to a seventh aspect, an embodiment of this application provides a chip, including a memory and a processor. The memory is configured to store a program instruction, and the processor is configured to invoke the program instruction in the memory to perform the model file management method according to the first aspect or the second aspect in the embodiments of this application.

According to an eighth aspect, an embodiment of this application provides a readable storage medium. The readable storage medium stores a computer program. When the computer program is executed, the model file management method according to the first aspect or the second aspect in the embodiments of this application is implemented.

According to a ninth aspect an embodiment of this application provides a program product. The program product includes a computer program, and the computer program is stored in a readable storage medium. At least one processor of a terminal device may read the computer program from the readable storage medium, and the at least one processor executes the computer program, so that the terminal device implements the model file management method according to the first aspect or the second aspect in the embodiments of this application.

According to a tenth aspect, an embodiment of this application provides a program product. The program product includes a computer program, and the computer program is stored in a readable storage medium. At least one processor of a server may read the computer program from the readable storage medium, and the at least one processor executes the computer program, so that the server implements the model file management method according to the first aspect or the second aspect in the embodiments of this application.

According to an eleventh aspect, an embodiment of this application provides a model file management system, including the foregoing terminal device and the foregoing server.

According to the model file management method and the terminal device provided in the embodiments of this application, an application is decoupled from a model file, so that the terminal device can locally store a general model file, and perform centralized management on the model file. The general model file can be invoked by a plurality of applications, thereby reducing redundant storage of the model file in the terminal device, and saving resources of the terminal device.

DESCRIPTION OF EMBODIMENTS

The following describes the embodiments of this application with reference to the accompanying drawings.

Figure 1:
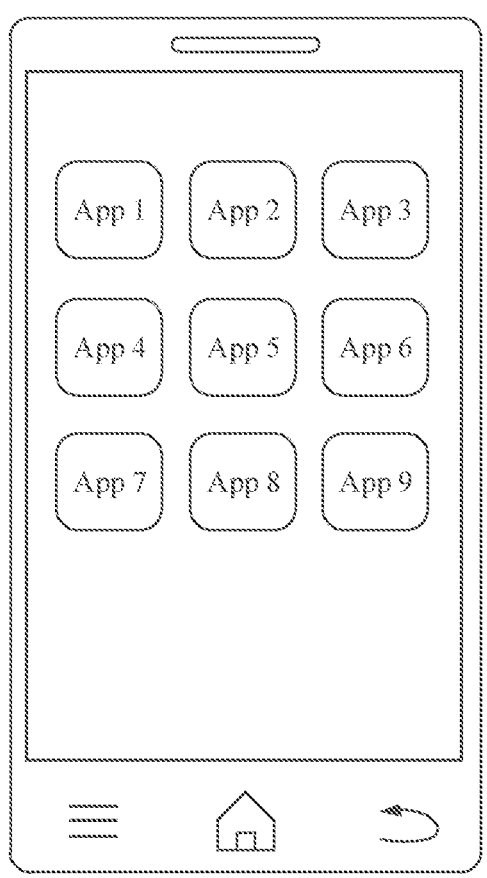
FIG. 1 is a schematic diagram of an interface of a terminal device according to an embodiment of this application.

A plurality of applications (Apps) may be installed on a terminal device. The application runs based on a hardware resource and a software resource of the terminal device. Optionally, the hardware resource may include but is not limited to at least one of the following: a chip, a processor, a memory, and the like. The software resource may include but is not limited to at least one of the following: a version, a language, and the like of an operating system of the terminal device. Optionally, the chip may include but is not limited to a central processing unit (central processing unit, CPU), a neural network processing unit (neural network processing unit, NPU), a graphics processing unit (graphics processing unit, GPU), and the like. The language may include Chinese, English, French, Japanese, Korean, and the like. For example, FIG. 1 is a schematic diagram of an interface of a terminal device according to an embodiment of this application. As shown in FIG. 1, nine applications, namely, an app 1 to an app 9, are installed on the terminal device. A quantity, names, and implemented functions of applications installed on the terminal device are not limited in this embodiment of this application.

With development, of AI technologies, the application may implement a specific function by using an AI model file, for example, a facial recognition function, a speech recognition function, a semantics recognition function, an image processing function, an image restoration function, an object detection function, or an intelligent navigation function. In the embodiments of this application, a model file is a related file that is available to different applications, is related to a hardware resource and/or a software resource, and can provide algorithm support for a specific function. Optionally, the specific function may be or may not be an AI feature. A name of the model file is not limited in the embodiments of this application. For example, the model file may also be referred to as an algorithm support file or an AI algorithm model file. Optionally, model files related to a specific function may be packaged into a model file package. A name of the model file package is not limited in the embodiments of this application. For example, the model file package may be referred to as an algorithm support file package or an AI algorithm model file package.

The following uses an example to distinguish the model file from the model file package. For example, there are 15 model files related to the speech recognition function, and the model files are respectively named a model file 1 to a model file 15. The model files 1 to 7 may run on the NPU, and the model files 8 to 15 may run on the CPU. There are 20 model files related to the semantics recognition function, and the model files are respectively named a model file 21 to a model file 40. The model files 21 to 35 may run on the CPU, and the model files 36 to 40 may run on the NPU. The speech recognition function is usually associated with the semantics recognition function. Therefore, based on different supported chips (the CPU or the NPU), the model files 1 to 7 and the model files 21 to 35 may be packaged into a model file package 1, and the model files 8 to 15 and the model files 36 to 40 may be packaged into a mode) file package 2. It should be noted that a quantity of features related to the model file package is not limited in this application.

The model file varies with a software resource and/or a hardware resource related to the model file. Even if model files implement a same function, the model files are different model files if different software resources and/or hardware resources are used. For example, model files for implementing the facial recognition function may include but are not limited to a model file 1 running on the CPU, a model file 2 running on the NPU, a model file 3 running on the GPU, a model file 4 in Chinese, and a model file 5 in English. Optionally, the model file may be further related to a region in which the terminal device is used, a skin color of a user, and the like. It may be learned that there are a large number of model files and model file packages.

Figure 2:
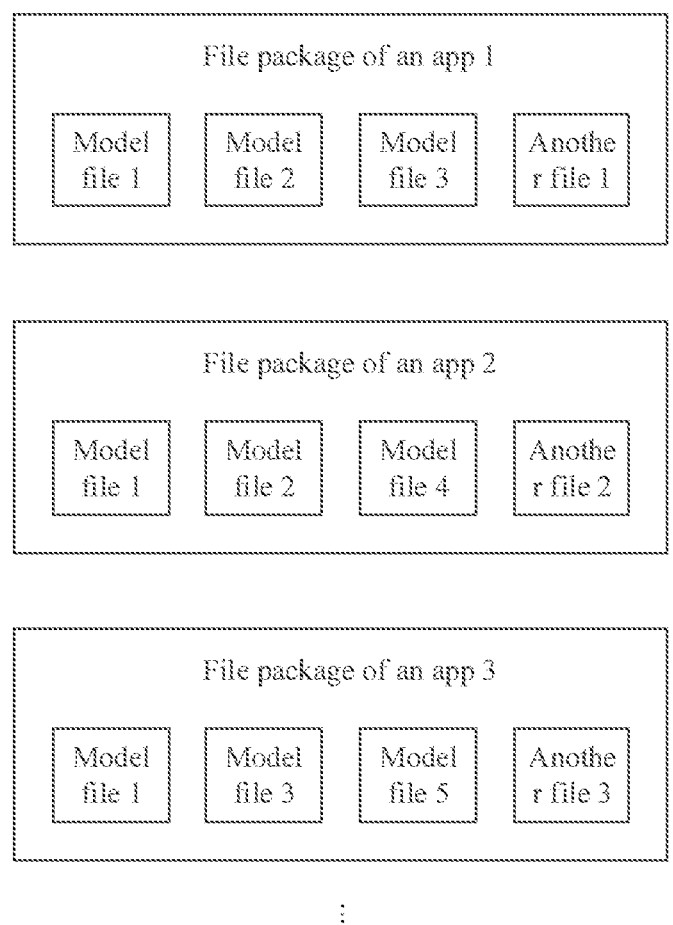
FIG. 2 is a schematic diagram of an existing application file package.

In the conventional technology, model files are usually packaged into an app file package. For example, FIG. 2 is a schematic diagram of an existing application file package. With reference to FIG. 1 and FIG. 2, a file package of the app 1 includes a model file 1, a model file 2, a model file 3, and another file 1, a file package of the app 2 includes the model file 1, the model file 2, a model file 4, and another file 2, and a file package of the app 3 includes the model file 1, the model file 3, a model file 5, and another file 3. Each of the app 1 to the app 3 includes the model file 1, both the app 1 and the app 2 include the model file 2, and both the app 1 and the app 3 include the model file 3. It may be learned that different application file packages may include a general model file. In this way, when the model file or the application changes, the entire application file package needs to be updated. Consequently, the application file package is relatively large, the model file is redundant, and limited resources of the terminal device are occupied, reducing resource utilization of the terminal device.

Figure 3:
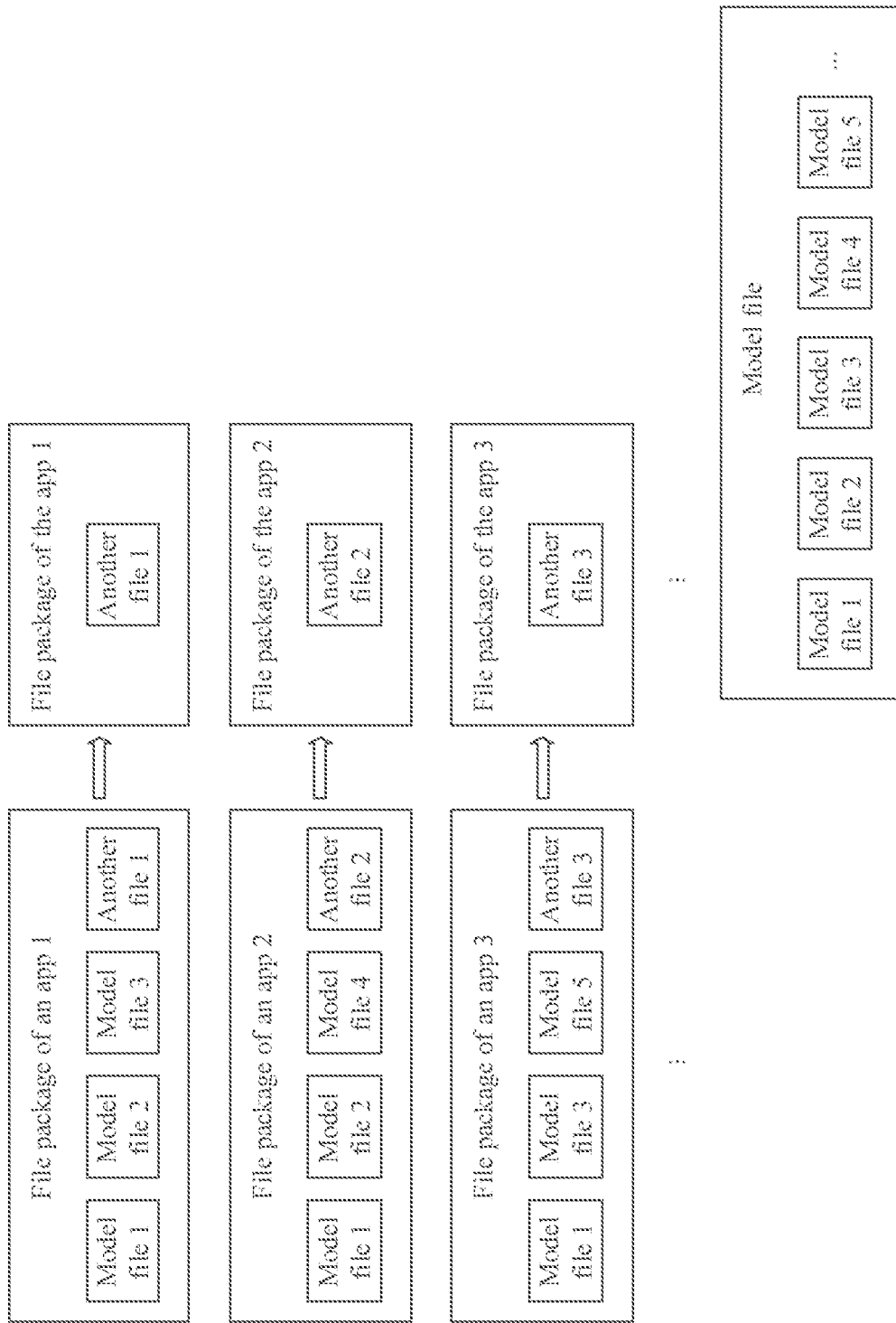
FIG. 3 is a schematic diagram of a model file management principle according to an embodiment of this application.

To resolve the foregoing technical problem, in a model file management method provided in an embodiment of this application, a model file is decoupled from an application, and centralized management is performed on a general model file. In this way, a size of an application file package is reduced, and storage resources, of a terminal device, occupied by the model file are reduced. The following describes, with reference to FIG. 3, a model file management principle provided in this application. A left side in FIG. 3 is similar to that in FIG. 2, and a right side in FIG. 3 shows content in an application file package in this application. As shown on the right side in FIG. 3, a file package of an app 1 includes another file 1, a file package of an app 2 includes another file 2, and a file package of an app 3 includes another file 3. Model files that are centrally managed may be further included, for example, a model file 1 to a model file 5. It may be learned that by performing centralized management on a general model file, redundancy of the model file in a terminal device is greatly reduced, and resources of the terminal device are saved. In addition, a change of the model file is relatively independent of a change of an application. Therefore, model file management efficiency and a model file management effect are improved.

It should be noted that FIG. 2 and FIG. 3 are merely examples. A model file used by an application and specific content included in an application file package are not limited in the embodiments of this application. Optionally, in the embodiments of this application, the application file package may also include the model file, hut a quantity of model files included is greatly reduced compared with a quantity of model files in the conventional technology.

Figure 4:
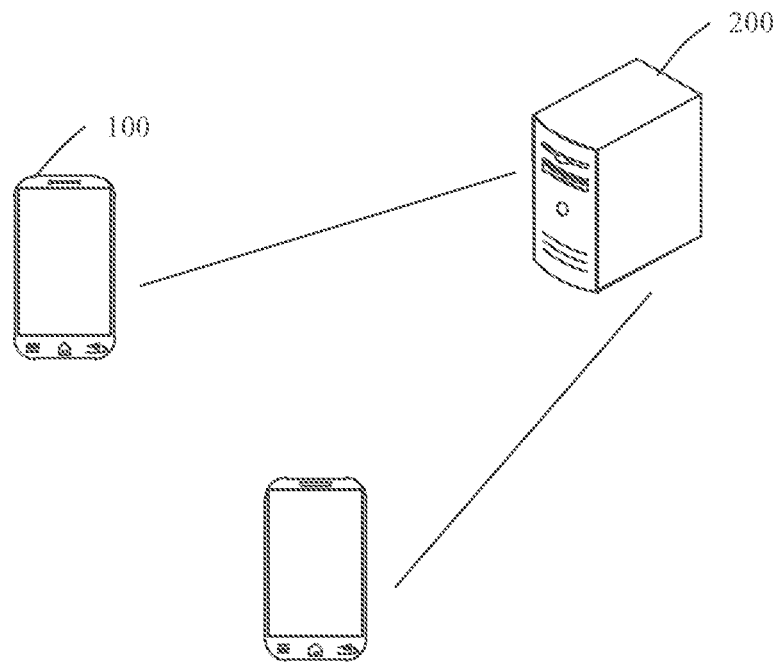
FIG. 4 is an architectural diagram of a system to which the embodiments of this application are applicable.

The following describes a system architecture to which the embodiments of this application are applicable. For example, FIG. 4 is an architectural diagram of a system to which the embodiments of this application are applicable. As shown in FIG. 4, the system may include a terminal 100 and a server 200. A quantity and a type of terminal devices and servers are not limited in the embodiments of this application. For example, the terminal device may be a mobile phone, a tablet computer, a handheld device, a vehicle-mounted device, a wearable device, or a computing device with a wireless connection function. The server may be a computer, a standalone server, a cloud server, or the like. The terminal device may communicate with the server in a wireless or wired manner. An application is installed on the terminal device. The application may obtain a model file for use from a plurality of model files that are centrally managed. Optionally, the plurality of centrally managed model files may be stored in the terminal device and/or the server. Usually, more model files are stored in the server than in the terminal device because storage resources of the terminal device are limited and there are a large number of model files. The terminal device may communicate with the server, to actively or passively obtain the model file by using the server. Optionally, in this embodiment of this application, the terminal device updates a locally stored model file on a basis of a model file package. Optionally, a user may log in to the server by using an account and a password, and publish a newly developed model file package, a modified or changed model file package, and the like in the server. The server may communicate with the terminal device to update the model file package for the terminal device.

The following describes a model file management framework in the embodiments of this application. Optionally, the model file management framework may include a model file management module disposed on the server, so that the server can implement centralized management of a model file. Optionally, the model file management framework may further include a model file management module disposed on the terminal device, so that the terminal device can implement centralized management of a model file. The model file management framework may be implemented by using a software program and/or hardware.

Figure 5:
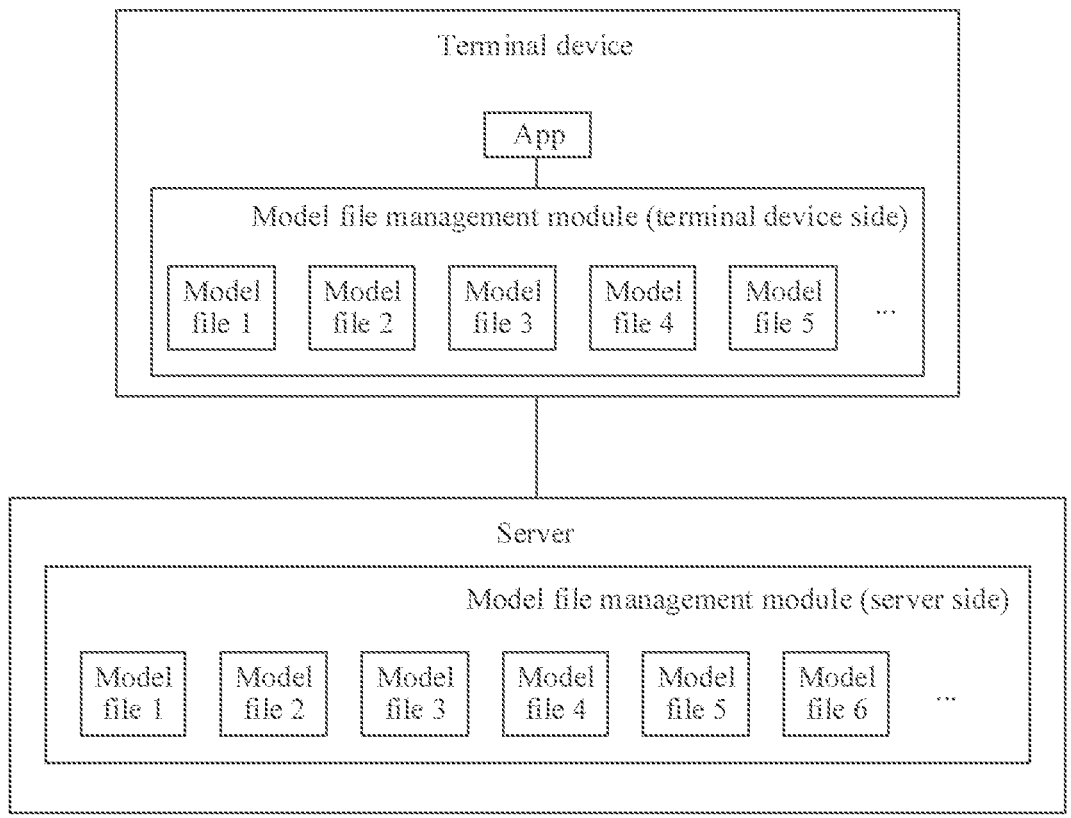
FIG. 5 is another schematic diagram of a model file management principle according to an embodiment of this application.

Optionally, in an implementation, as shown in FIG. 5, the model file management framework may include the model file management module disposed on the server and the model file management module disposed on the terminal device. In this implementation, the terminal device may store a plurality of model files, for example, include at least model files 1 to 5. Cross-process communication may be performed between an application (App) and the model file management module. When the application runs a service and needs to load a model file, the model file management module on the terminal device may first search a locally stored model file. If a model file that matches the application is locally stored, the model file is directly provided for the application. If there is no locally stored model file that matches the application, the model file management module may communicate with the server, to obtain a corresponding model file from the server. It should be noted that the terminal device may locally store the model file on a basis of a model file or a model file package.

Figure 6:
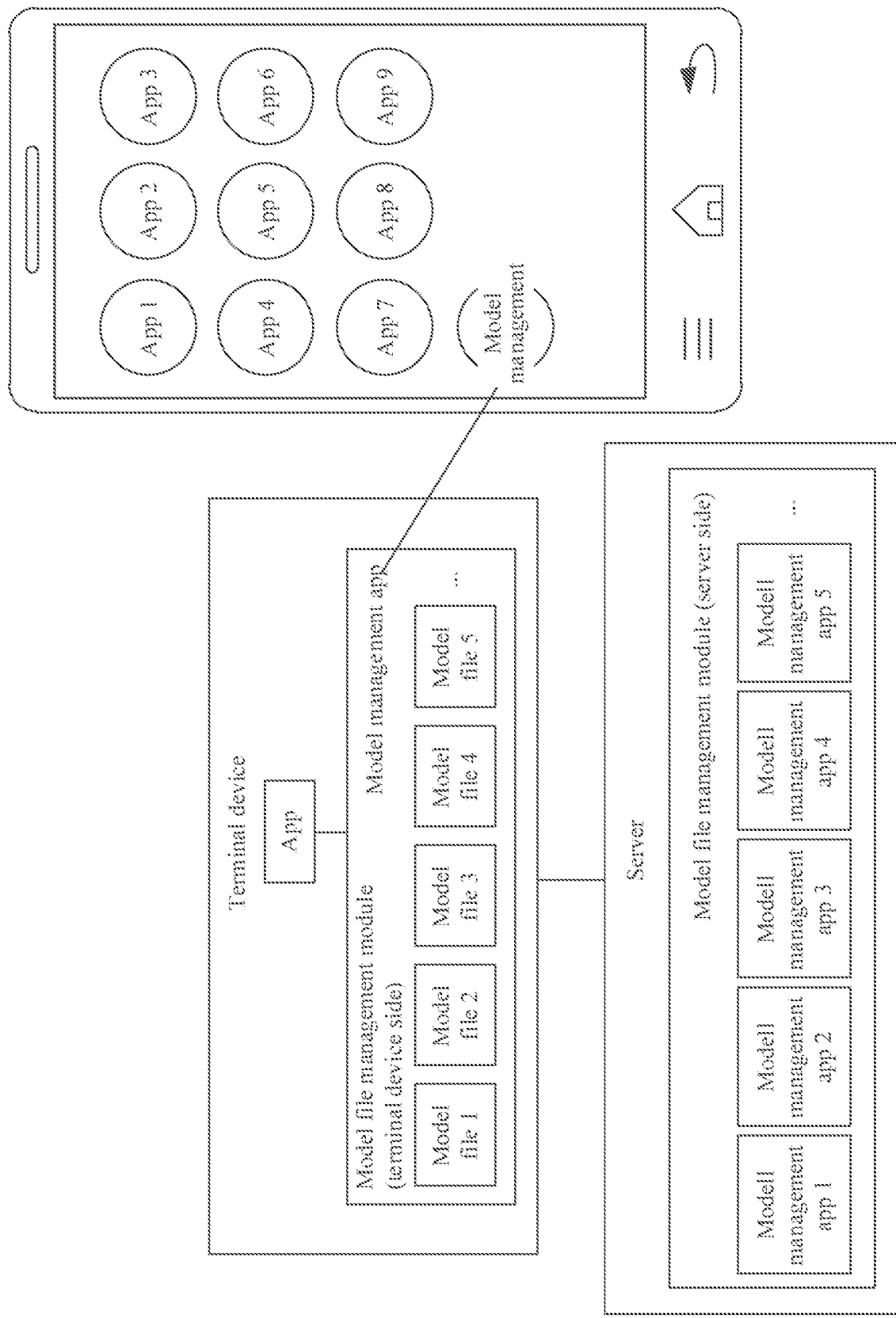
FIG. 6 is still another schematic diagram of a model file management principle according to an embodiment of this application.

Optionally, in another implementation, as shown in FIG. 6, the model file management framework may include the model file management module disposed on the server and the model file management module disposed on the terminal device. A difference between this implementation and the implementation shown in FIG. 5 lies in that the model file management module on the terminal device is implemented by using a model management app. Similar to another app installed on the terminal device, the model management app can be downloaded, updated, and deleted. Optionally, an icon of the model management app may be displayed on a display of the terminal device, for example, a "model management" icon shown on a right side in FIG. 6.

The following describes a parameter of a model file and a parameter of a model file package in the embodiments of this application.

Specifically, the model file has a parameter. The parameter of the model file is used to describe the model file and a use environment of the model file. For example, the parameter includes a software resource and/or a hardware resource on which the model file depends when running. A quantity of parameters of the model file, a name of the parameter, a meaning of the parameter, a value of the parameter, meanings of different values of the parameter, a field type of the parameter in a software program, whether the parameter needs to be set, and the like are not limited in the embodiments of this application.

For example, referring to Table 1, the parameter of the model file may include at least one of parameters shown in Table 1.

TABLE 1

| Name of a parameter | Description of the parameter |
| --- | --- |
| origin_id | Identifier of a model file |
| resid | Identifier of a model file package to which the model file belongs |

TABLE 1-continued

| Name of a parameter | Description of the parameter |
| --- | --- |
| name | Name of the model file |
| description | Description of the model file |
| file_path | Path of the model file |
| modle_type | Type of the model file, where a value of 1 represents a model (structure), a value of 2 represents a weight file, a value of 3 represents a mean file, and a value of 4 represents a dictionary. |
| platform | Platform type (Caffe/Tensorflow/ . . .) |
| tech_domain | Technical field (convolutional neural network (Convolutional Neural Networks, CNN)/hidden Markov model (Hidden Markov Model, HMM) . . .) |
| busi_domain | Service domain (image/voice/ . . .) |
| region | Region (China/Outside China) |
| chip_type | Chip type (GPU/CPU/XPU) |
| version | Version number of the model file |
| format | Format (binary/txt/json/ . . .) of the model file |
| storage_type | Storage type (file/kv/ . . .) |
| size | Size of the model file (for example, in bytes) |
| is_encrypt | Indicates whether the model file is encrypted, where 0 represents that the model file is not encrypted, and 1 represents that the model file is encrypted |
| is_compressed | Indicates whether the model file is compressed, where 0 represents that the model file is not compressed, and 1 represents that the model file is compressed |
| encrypt_desc | Encryption description, for example, an algorithm and a parameter that can be used for decryption |
| reserved_1 | Reserved field |

The model file package also has a parameter, and the parameter of the model file package is used to describe the model file package and a software resource and/or a hardware resource related to the model file package. A quantity of parameters of the model file package, a name of the parameter, a meaning of the parameter, a value of the parameter, meanings of different values of the parameter, a field type of the parameter in a software program, whether the parameter needs to be set, and the like are not limited in the embodiments of this application. For example, referring to Table 2, the parameter of the model file package may include at least one of parameters shown in Table 2.

TABLE 2

| Name of a parameter | Description of the parameter |
| --- | --- |
| resid | Identifier of a model file package |
| version | Version number of the model file package |
| xpu | Chip type supported by the model file package |
| emuiFamily | Operating system type to which the model file package is applicable |
| productFamily | Product family to which the model file package is applicable |
| product | Product model to which the model file package is applicable |
| productModel | Product version to which the model file package is applicable |
| chipsetVendor | Chip series to which the model file package is applicable |
| chipset | Chip model to which the model file package is applicable |
| district | Region to which the model file package is applicable |
| appVersion | Feature version to which the model file package is applicable, for example, facial recognition algorithm 1.0 or facial recognition algorithm 2.0 |
| interfaceVersion | Algorithm version to which the model file package is applicable, for example, algorithm 1.0 or algorithm 2.0 |

Figure 7:
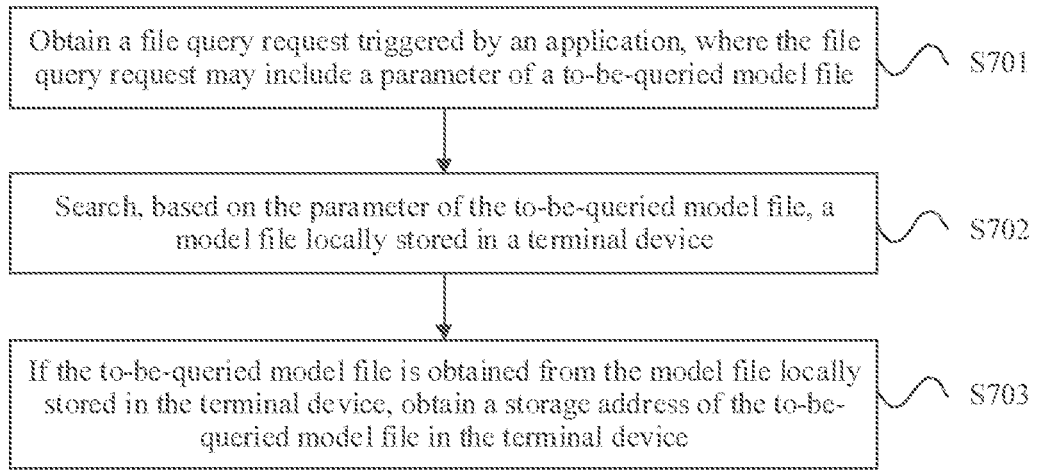
FIG. 7 is a flowchart of a model file management method according to an embodiment of this application.

The following uses specific embodiments to describe in detail technical solutions of this application and how the technical solutions of this application resolve the foregoing technical problem. The following several specific embodi- FIG. 7 is a flowchart of a model file management method according to an embodiment of this application. The model file management method provided in this embodiment may be performed by a terminal device. As shown in FIG. 7, the model file management method provided in this embodiment may include the following steps.

S701. Obtain a file query request triggered by an application, where the file query request may include a parameter of a to-be-queried model file.

In this embodiment of this application, the to-be-queried model file may also be referred to as a target model file.

Specifically, an application scenario of this embodiment may be as follows: When running a service, the application needs to load a model file, to trigger query and obtaining of the model file. Optionally, the service may be an AI service. For example, when a user taps an icon of the application on a screen of the terminal device, the terminal device starts the application. After the application is started, the user logs in to the application through facial recognition. In this case, the application needs to run a model file related to a facial recognition function. The terminal device may obtain the file query request triggered by the application.

Optionally, the parameter of the to-be-queried model file may include but is not limited to an identifier and a version number of the model file. A quantity of parameters of the to-be-queried model file is not limited in this embodiment.

S702. Search, based on the parameter of the to-be-queried model file, a model file locally stored in the terminal device.

S703. If the to-be-queried model file is obtained from the model file locally stored in the terminal device, obtain a storage address of the to-be-queried model file in the terminal device.

It may be learned that according to the model file management method provided in this embodiment, the terminal device may locally store a general model file, and perform centralized management on the model file. When the application triggers a model file query, the terminal device first searches the locally stored model file. If the locally stored model file includes the to-be-queried model file, the local storage address of the to-be-queried model file is provided for the application. In comparison with the conventional technology, an application is decoupled from a model file, so that the general model file locally stored in the terminal device is used by a plurality of applications, thereby reducing redundant storage of the model file in the terminal device, and saving resources of the terminal device.

Optionally, the model file management method provided in this embodiment may further include the following step:

Obtain the to-be-queried model file based on the storage address of the to-be-queried model file in the terminal device, so that the application loads the to-be-queried model file.

Specifically, the application may read the to-be-queried model file from the local storage address of the to-be-queried model file, and load the to-be-queried model file by invoking a model file loading interface, to implement a specific function of the application.

Optionally, the model file locally stored in the terminal device may be or may not be encrypted. A manner of encrypting the model file for storage is not limited in this embodiment.

The model file is encrypted for storage, to improve centralized management security of the model file.

Optionally, if the model file locally stored in the terminal device is encrypted, before the application loads the to-be-queried model file, the method may further include the following step:

Decrypt the to-be-queried model file.

Figure 8:
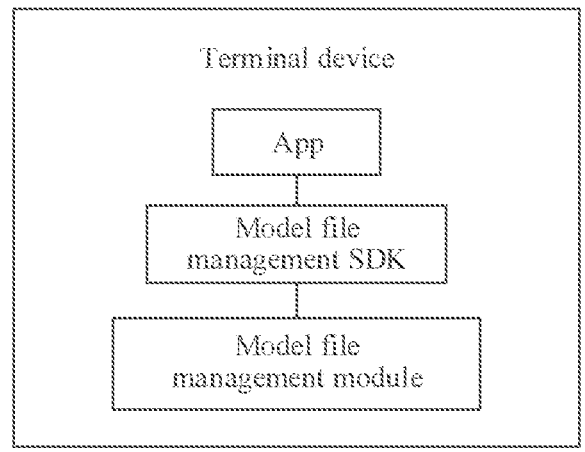
FIG. 8 is a schematic diagram of an internal software framework of a terminal device according to an embodiment of this application.

Optionally, FIG. 8 is a schematic diagram of an internal software framework of a terminal device according to an embodiment of this application. As shown in FIG. 8, the software framework of the terminal device may include an application (App), a model file management software development kit (software development kit, SDK), and a model file management module. The application may be integrated with a model file management SDK. Optionally, cross-process communication may be performed between the application and the model file management module, and between the model file management SDK and the model file management module. The model file management SDK can support functions of model file query, reading, and decryption. Correspondingly, the application can implement functions of model file query, reading, and decryption by using the integrated model file management SDK. Specifically, after the application triggers a file query request, the application searches, by using a model file query interface provided by the model file management SDK, a model file locally stored in the terminal device. If a to-be-queried model file can be locally found, and the model file locally stored in the terminal device is encrypted, the application may decrypt and load the to-be-queried model file in a process of the application by using a model file loading interface provided by the model file management SDK. The application decrypts and reads the model file in the process of the application, and therefore model file loading efficiency is ensured.

Figure 9:
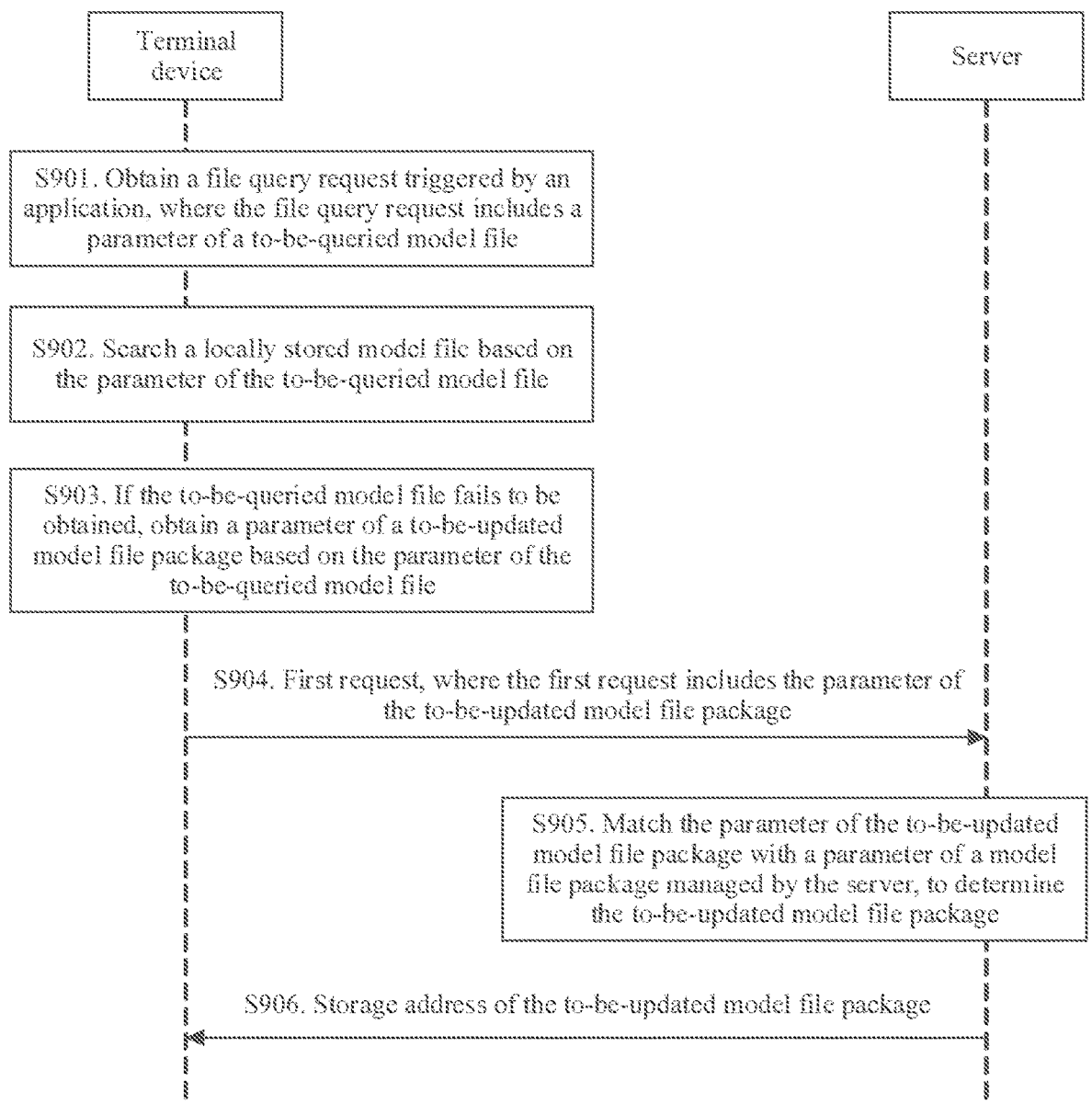
FIG. 9 is another flowchart of a model file management method according to an embodiment of this application.

FIG. 9 is another flowchart of a model file management method according to an embodiment of this application. The model file management method provided in this embodiment, is performed by a terminal device and a server. As shown in FIG. 9, the model file management method provided in this embodiment may include the following steps.

S901. The terminal device obtains a file query request triggered by an application, where the file query request may include a parameter of a to-be-queried model file.

S902. The terminal device searches, based on the parameter of the to-be-queried model file, a model file locally stored in the terminal device.

For description of S901 and S902, refer to the description of S701 and S702. Details are not described herein again.

S903. If the to-be-queried model file fails to be obtained from the model file locally stored in the terminal device, obtain a parameter of a to-be-updated model file package based on the parameter of the to-be-queried model file.

In this embodiment of this application, the to-be-updated model file package may also be referred to as a target model file package.

Specifically, an application scenario of this embodiment may be as follows: When running a service, the application needs to load a model file, to trigger query and obtaining of the model file. The terminal device first searches the locally stored model file. If the locally stored model file does not include the to-be-queried model file, the to-be-queried model file needs to be further obtained from the server. In this embodiment, an update may be made between the terminal device and the server on a basis of a model file package. The terminal device may obtain the parameter of the to-be-updated model file package based on the parameter of the to-be-queried model file.

Optionally, there is a mapping relationship between a parameter of a model file and a parameter of a model file package. The mapping relationship is not limited in this embodiment. For example, referring to Table 1. In Table 1, there is a mapping relationship between an identifier origin_id of a model file and an identifier resid of a model file package.

It should be noted that a quantity of parameters of the to-be-updated model file package is not limited in this embodiment. Optionally, referring to Table 2, the parameter of the to-be-updated model file package may include but is not limited to the parameters shown in Table 2.

S904. The terminal device sends a first request to the server, where the first request includes the parameter of the to-be-updated model file package, and the first request is used to request the to-be-updated model file package.

Correspondingly, the server receives the first request sent by the terminal device.

S905. The server matches the parameter of the to-be-updated model file package with a parameter of a model file package managed by the server, to determine the to-be-updated model file package.

Matching between parameters of model file packages is subsequently described by using an embodiment shown in FIG. 13.

S906. The server sends a storage address of the to-be-updated model file package to the terminal device.

Correspondingly, the terminal device receives the storage address that is of the to-be-updated model file package and that is sent by the server.

It may be learned that according to the model file management method provided in this embodiment, the application on the terminal device may trigger a model file query. When the to-be-queried model file cannot be found in the model file locally stored in the terminal device, a model file package that includes the to-be-queried model file may be further obtained from the server. In comparison with the conventional technology, an application is decoupled from a model file, so that the terminal device and the server perform centralized management on a general model file, thereby reducing redundant storage of the model file in the terminal device, and saving resources of the terminal device. In addition, a required model file is provided for the application, to ensure normal running of the application.

Optionally, the model file management method provided in this embodiment may further include the following step:

The terminal device obtains the to-be-updated model file package based on the storage address of the to-be-updated model file package.

Specifically, the terminal device may access the storage address of the to-be-updated model file package, to locally store the to-be-updated model file package. The to-be-updated model file package includes the model file queried by the application, and therefore the storage address of the to-be-queried model file in the terminal device can be subsequently provided for the application, so that the application can load the to-be-queried model file, to implement a specific function of the application.

It should be noted that a model file in a model file package managed by the server may be stored in a memory in the server, or may be stored in a memory outside the server.

It should be noted that the model file in the model file package managed by the server may be or may not be encrypted. A manner of encrypting the model file for storage is not limited in this embodiment.

Figure 10:
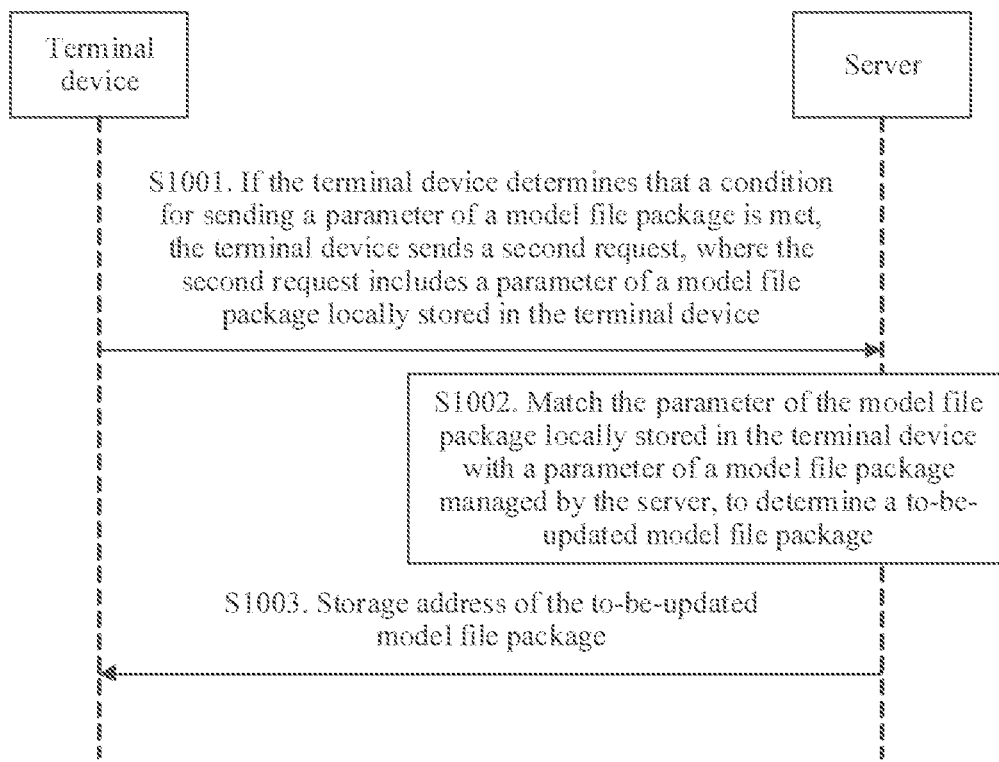
FIG. 10 is still another flowchart of a model file management method according to an embodiment of this application.

FIG. 10 is still another flowchart of a model file management method according to an embodiment of this application. The model file management method provided in this embodiment is performed by a terminal device and a server. As shown in FIG. 10, the model file management method provided in this embodiment may include the following steps.

S1001. If the terminal device determines that a condition for sending a parameter of a model file package is met, the terminal device sends a second request to the server, where the second request includes a parameter of a model file package locally stored in the terminal device.

Correspondingly, the server receives the second request sent by the terminal device.

Specifically, an application scenario of this embodiment may be as follows: When the terminal device determines that a condition for updating a locally stored model file package or the condition for sending a parameter of a model file package is met, the terminal device may actively obtain an updated model file package from the server. The condition for sending a parameter of a model file package or the condition for updating a model file package is not limited in this embodiment. For example, when a period for sending a parameter of a model file package or a period for updating a model file package is met, or when the terminal device detects that a current wireless network connection is a wireless local area network (wireless local area networks, WLAN) or Bluetooth, or when the terminal device determines that a current remaining battery level is greater than a preset percentage, the terminal device may actively trigger updating of the locally stored model file package.

In this step, the terminal device may send the parameter of the locally stored model file package to the server, so that the server matches the parameter of the model file package locally stored in the terminal device with a parameter of a model file package managed by the server, to determine whether the model file package locally stored in the terminal device needs to be updated. It should be noted that a model file package whose parameter is to be sent by the terminal device is not limited in this embodiment. For example, the terminal device may obtain a use time of an application in latest preset duration, determine an application frequently used by a user, and send a parameter of a model file package to which a model file invoked by the application frequently used by the user belongs to the server. For another example, the terminal device may obtain a priority of an application, and send a parameter of a model file package to which a model file invoked by an application with a higher priority belongs to the server. Optionally, the priority may be a security priority.

S1002. The server matches the parameter that is of the model file package locally stored in the terminal device and that is included in the second request with the parameter of the model file package managed by the server, to determine a to-be-updated model file package.

Matching between parameters of model file packages is subsequently described by using an embodiment shown in FIG. 13.

S1003. The server sends a storage address of the to-be-updated model file package to the terminal device.

Correspondingly, the terminal device receives the storage address that is of the to-be-updated model file package and that is sent by the server.

It may be learned that according to the model file management method provided in this embodiment, the terminal device may actively trigger updating of the locally stored model file package, the terminal device sends the parameter of the locally stored model file package to the server, and the server determines the to-be-updated model file package. In this way, the terminal device can update the locally stored model file package. In comparison with the conventional technology; an application is decoupled from a model file, so that an update operation can be completed only for the model file. In this way, redundant storage of the model file in the terminal device is reduced, resources of the terminal device are saved, and validity of the model file is ensured, thereby improving model file update efficiency and a model file update effect.

Optionally, the model file management method provided in this embodiment may further include the following step:

The terminal device obtains the to-be-updated model file package based on the storage address of the to-be-updated model file package.

For details, refer to the description in the embodiment shown in FIG. 9. Details are not described herein again.

Figure 11:
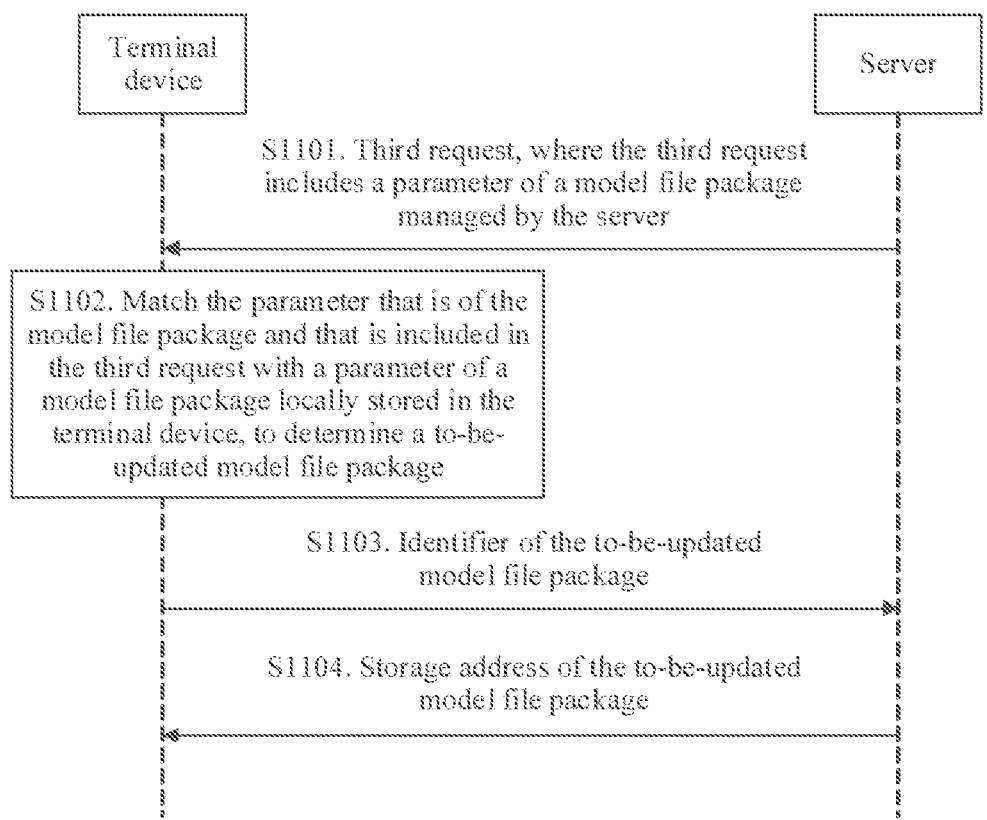
FIG. 11 is still another flowchart of a model file management method according to an embodiment of this application.

FIG. 11 is still another flowchart of a model file management method according to an embodiment of this application. The model file management method provided in this embodiment is performed by a terminal device and a server. As shown in FIG. 11, the model file management method provided in this embodiment may include the following steps.

S1101. The server sends a third request to the terminal device, where the third request includes a parameter of a model file package managed by the server.

Correspondingly, the terminal device receives the third request sent by the server.

Specifically, an application scenario of this embodiment may be as follows: The server actively triggers updating of a model file package locally stored in the terminal device. A trigger condition for the server to send the third request is not limited in this embodiment. For example, the trigger condition may be similar to a trigger condition for the terminal device to send the second request in the embodiment shown in FIG. 10. For another example, when detecting that a developer logs in to the server and uploads a new model file package, the server may send the third request to the terminal device.

In this step, the server may send the parameter of the managed model file package to the terminal device, so that the terminal device matches the parameter of the model file package locally stored in the terminal device with the parameter of the model file package managed by the server, to determine whether the model file package locally stored in the terminal device needs to be updated. It should be noted that a model file package whose parameter is to be sent by the server is not limited in this embodiment. For example, the server may send a parameter of a latest version of a model file package that implements a same function to the terminal device. For another example, the server may send a parameter of a detected and newly uploaded model file package to the terminal device.

S1102. The terminal device matches the parameter that is of the model file package and that is included in the third request with the parameter of the model file package locally stored in the terminal device, to determine a to-be-updated model file package.

Matching between parameters of model file packages is subsequently described by using an embodiment shown in FIG. 13.

S1103. The terminal device sends an identifier of the to-be-updated model file package to the server.

Correspondingly, the server receives the identifier that is of the to-be-updated model file package and that is sent by the terminal device.

Optionally, the terminal device may further send another parameter of the to-be-updated model file package to the server, for example, at least one parameter other than the identifier of the model file package in Table 2. This is not limited in this embodiment.

S1104. The server sends a storage address of the to-be-updated model file package to the terminal device.

Correspondingly, the terminal device receives the storage address that is of the to-be-updated model file package and that is sent by the server.

It may be learned that according to the model file management method provided in this embodiment, the server may actively trigger updating of the model file package locally stored in the terminal device. The server sends the parameter of the model file package managed by the server to the terminal device, and the terminal device determines the to-be-updated model file package. In this way, the terminal device can obtain an updated model file package from the server, to update the locally stored model file package. In comparison with the conventional technology, an application is decoupled from a model file, so that an update operation can be completed only for the model file. In this way, redundant storage of the model file in the terminal device is reduced, resources of the terminal device are saved, and validity of the model file is ensured, thereby improving model file update efficiency and a model file update effect.

Optionally, the model file management method provided in this embodiment may further include the following step:

The terminal device obtains the to-be-updated model file package based on the storage address of the to-be-updated model file package.

For details, refer to the description in the embodiment shown in FIG. 9. Details are not described herein again.

Figure 12:
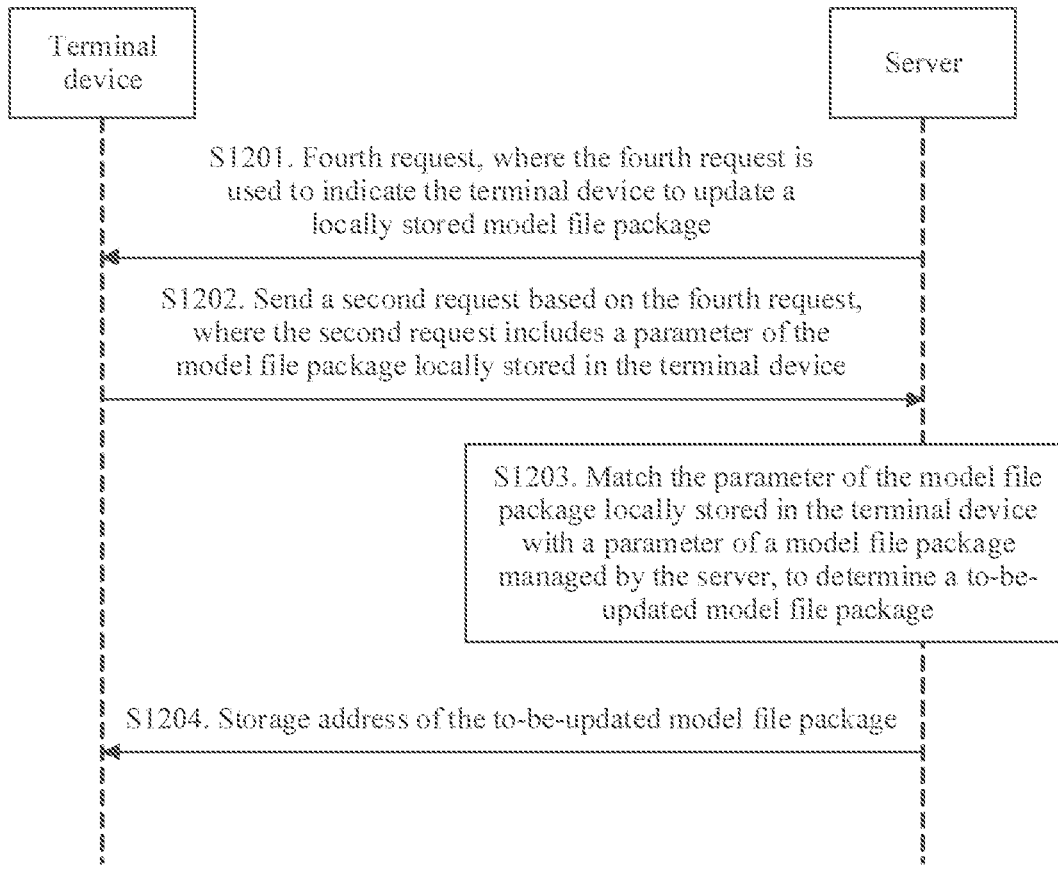
FIG. 12 is still another flowchart of a model file management method according to an embodiment of this application.

FIG. 12 is still another flowchart of a model file management method according to an embodiment of this application. The model file management method provided in this embodiment is performed by a terminal device and a server. As shown in FIG. 12, the model file management method provided in this embodiment may include the following steps.

S1201. The server sends a fourth request to the terminal device, where the fourth request is used to indicate the terminal device to update a locally stored model file package.

Correspondingly, the terminal device receives the fourth request sent by the server.

Specifically, an application scenario of this embodiment may be as follows: The server actively triggers updating of the model file package locally stored in the terminal device. A trigger condition for the server to send the fourth request is not limited in this embodiment, and reference may be made to the trigger condition of the third request in the embodiment shown in FIG. 11. Details are not described herein again.

S1202. The terminal device sends a second request to the server based on the fourth request, where the second request includes a parameter of the model file package locally stored in the terminal device.

Correspondingly, the server receives the second request sent by the terminal device.

For the second request, refer to the second request in S1001 in the embodiment shown in FIG. 10. Principles are similar. Details are not described herein again.

S1203. The server matches the parameter that is of the model file package locally stored in the terminal device and that is included in the second request with a parameter of a model file package managed by the server, to determine a to-be-updated model file package.

S1204. The server sends a storage address of the to-be-updated model file package to the terminal device.

Correspondingly, the terminal device receives the storage address that is of the to-be-updated model file package and that is sent by the server.

For S1203 and S1204, refer to S1002 and S1003 in the embodiment shown in FIG. 10. Principles are similar. Details are not described herein again.

Optionally, the model file management method provided in this embodiment may further include the following step:

The terminal device obtains the to-be-updated model file package based on the storage address of the to-be-updated model file package.

For details, refer to the description in the embodiment shown in FIG. 9. Details are not described herein again.

It may be learned that according to the model file management method provided in this embodiment, the server may actively trigger updating of the model file package locally stored in the terminal device. The server sends a request message to the terminal device, to indicate the terminal device to update the locally stored model file package, the terminal device sends the parameter of the locally stored model file package to the server, and the server determines the to-be-updated model file package. In this way, the terminal device can update the locally stored model file package. In comparison with the conventional technology, an application is decoupled from a model file, so that an update operation can be completed only for the model file. In this way, redundant storage of the model file in the terminal device is reduced, resources of the terminal device are saved, and validity of the model file is ensured, thereby improving model file update efficiency and a model file update effect.

It should be noted that this embodiment and the embodiment shown in FIG. 11 each may be used in a case in which the server actively triggers updating of the model file package locally stored in the terminal device. A difference lies in that in this embodiment, the fourth request sent by the server to the terminal device may not carry the parameter of the model file package, the terminal device sends the parameter of the locally stored model file package to the server, and the server determines the to-be-updated model file package. However, in the embodiment shown in FIG. 11, the third request sent by the server to the terminal device carries the parameter of the model file package managed by the server, and the terminal device determines the to-be-updated model file package.

Figure 13:
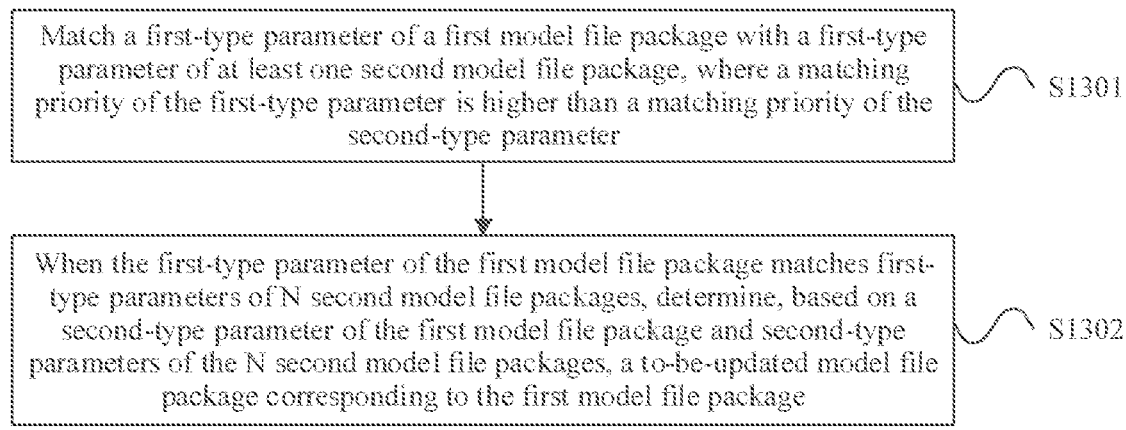
FIG. 13 is still another flowchart of a model file management method according to an embodiment of this application.

FIG. 13 is still another flowchart of a model file management method according to an embodiment of this application. The model file management method provided in this embodiment may be performed by a terminal device or a server. In this embodiment, there is a first model file package and a second model file package, and there is at least one second model file package. A parameter of the first model file package is matched with a parameter of the at least one second model file package, to determine a to-be-updated model file package corresponding to the first model file package. As shown in FIG. 13, the model file management method provided in this embodiment may include the following steps:

S1301. Match a first-type parameter of the first model file package with a first-type parameter of the at least one second model file package. The parameter of each of the first model file package and the second model file package includes the first-type parameter and a second-type parameter. A matching priority of the first-type parameter is higher than a matching priority of the second-type parameter.

A quantity of sub-parameters included in each of the first-type parameter and the second-type parameter is not limited in this embodiment.

The following provides description by using an example and with reference to Table 2.

Table 2 shows 12 parameters. If a model file package includes the 12 parameters, the first-type parameter may include four sub-parameters: resid (an identifier of the model file package), version (a version number of the model file package), appVersion (a feature version to which the model file package is applicable), and interfaceVersion (an algorithm version to which the model file package is applicable), and the second-type parameter includes the remaining eight sub-parameters.

The matching priority of the first-type parameter is higher than the matching priority of the second-type parameter, and therefore matching is first performed for a parameter with a higher matching priority. It should be noted that if the first-type parameter includes a plurality of sub-parameters, a matching sequence of the plurality of sub-parameters is not limited in this embodiment. For example, in the foregoing example, a matching sequence of sub-parameters included in the first-type parameter may be resid>version>appVersion>interfaceVersion or appVersion>interfaceVersion>resid>version.

S1302. When the first-type parameter of the first model file package matches first-type parameters of N second model file packages, determine, based on a second-type parameter of the first model file package and second-type parameters of the N second model file packages, a to-be-updated model file package corresponding to the first model file package, where N is a positive integer.

Specifically, after the first-type parameter of the first model file package is matched with the first-type parameter of the at least one second model file package, if the N second model file packages that are successfully matched for the first-type parameter can be obtained, the second-type parameter of the first model file package continues to be matched with the second-type parameters of the N second model file packages, to finally determine the to-be-updated model file package corresponding to the first model file package.

It may be learned that a to-be-updated model file package may be accurately obtained by performing matching on parameters of different matching priorities of model file packages.

It should be noted that a matching condition of each parameter of the model file package is not limited in this embodiment, and may vary with a meaning of the parameter. The first-type parameter has a relatively high matching priority, and exact match may be performed based on a preset matching condition of the parameter. The second-type parameter has a relatively low matching priority, and fuzzy match may be performed based on a preset matching condition of the parameter.

The following describes the preset matching condition by using an example.

For example, for the first-type parameter, a preset matching condition of the parameter "resid" may be "equal", a preset matching condition of the parameter "version" may be "greater than", a preset matching condition of the parameter "app Version" may be "equal", and a preset matching condition of the parameter "interface Version" may be "equal".

For example, referring to Table 3, values of identifiers, applicable feature versions, and algorithm versions of second model file packages A and C are all the same as values of related parameters of the first model file package, and version numbers of the second model file packages A and C are greater than a version number of the first model file package. Therefore, the second model file packages A and C successfully match the first model file package for the first-type parameter. An algorithm version to which a second model file package B is applicable is different from that of the first model file package, and a version number of the second model file package D is less than the version number of the first model file package. Therefore, matching fails.

TABLE 3

| Parameter | resid | version | appVersion | interfaceVersion |
|---|---|---|---|---|
| First model file package | 1 | 5 | 1 | 2 |
| Second model file package A | 1 | 6 | 1 | 2 |
| Second model file package B | 1 | 6 | 1 | 3 |
| Second model file package C | 1 | 7 | 1 | 2 |
| Second model file package D | 1 | 4 | 1 | 2 |

For example, for the second-type parameter, exact match is preferentially used. If exact match cannot be performed, a second model file package with a value of "general" may be selected.

For example, referring to Table 4, for a parameter "xpu", the second model file package A and the first model file package correspond to different values. Therefore, the second model file package A does not match the first model file package. Exact match cannot be performed for parameters "product" and "district" of the second model file package B, hut values are "general", therefore, the second model file package 13 matches the first model file package. For a parameter "chipset", the second mode) file package C and the first model file package correspond to different values. Therefore, the second model file package C does not match the first model file package. Values of all parameters of the second model file package D are "general". Therefore, the second model file package D matches the first model file package.

TABLE 4

| Parameter | product | chipset | district | xpu |
|---|---|---|---|---|
| First model file package | P1 | Q1 | China | CPU |
| Second model file package A | P1 | Q1 | China | NPU |
| Second model file package B | General | Q1 | General | CPU |
| Second model file package C | General | Q2 | General | CPU |
| Second model file package D | General | General | General | General |

Optionally, the second-type parameter includes a plurality of sub-parameters, and each sub-parameter has a different matching priority. The determining, based on a second-type parameter of the first model file package and second-type parameters of the N second model file packages, a to-be-updated model file package corresponding to the first model file package in S1302 may include:

Match the second-type parameter of the first model file package with the second-type parameters of the N second model file packages in a matching priority sequence of the sub-parameters, to determine the to-be-updated model file package.

The following provides description by using an example.

Further referring to the foregoing example, it is assumed that the second-type parameter includes eight sub-parameters, matching priorities are productModel>product>chipset>chipsetVendor>xpu>productFamily>district>emuiFamily, and preset matching conditions are the same.

In an example, referring to Table 5, values of One parameters "product" and "chipset" of both the second model file package A and the second model file package B are "general", and therefore the parameters "district" continue to be compared. Values of the parameters "district" of both the second model file package A and the first model file package are "China". Therefore, the second model file package A successfully matches the first model file package. The second model file package B fails to match the first model file package.

TABLE 5

| Parameter | product | chipset | district |
|---|---|---|---|
| First model file package | P1 | Q1 | China |
| Second model file package A | General | General | China |
| Second model file package B | General | General | General |

Based on preset matching rules and the matching priorities of the first-type parameter and the second-type parameter, in Table 6, the second model file package B successfully matches the first model file package. In Table 7, the second model file package A successfully matches the first model file package, in Table 8, the second model file package B successfully matches the first model file package, in Table 9, the second model file package A successfully matches the first model file package.

TABLE 6

| Parameter | product | chipset | district | version |
|---|---|---|---|---|
| First model file package | P1 | Q1 | China | 1 |
| Second model file package A | General | Q1 | Outside China | 2 |
| Second model file package B | General | General | General | 3 |

TABLE 7

| Parameter | product | chipset | district | version |
|---|---|---|---|---|
| First model file package | P1 | Q1 | China | 1 |
| Second model file package A | General | Q1 | General | 2 |
| Second model file package B | General | General | China | 3 |

TABLE 8

| Parameter | product | chipset | district | version |
|---|---|---|---|---|
| First model file package | P1 | Q1 | China | 1 |
| Second model file package A | General | General | China | 2 |
| Second model file package B | General | General | China | 3 |

TABLE 9

| Parameter | product | chipset | district | version |
|---|---|---|---|---|
| First model file package | General | General | China | 1 |
| Second model file package A | General | General | General | 2 |
| Second model file package B | General | Q1 | General | 3 |

It should be noted that the method embodiments shown in FIG. 7 to FIG. 13 may be combined with each other, and a combination manner is not limited in the embodiments.

Figure 14:
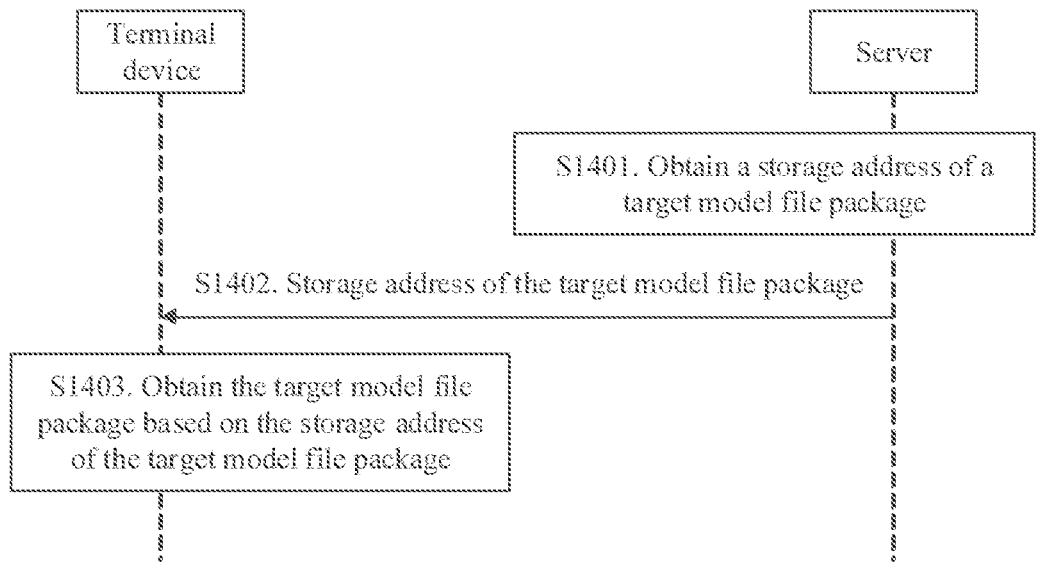
FIG. 14 is still another flowchart of a model file management method according to an embodiment of this application.

Based on the method embodiments shown in FIG. 7 to FIG. 13, an embodiment of this application may provide a model file management method. The method may be performed by a terminal device. Referring to S1402 and S1403 in FIG. 14, the model file management method may include the following steps:

The terminal device receives a storage address of a target model file package from a server; and
    the terminal device obtains the target model file package based on the storage address of the target model file package.

The target model file package is determined based on a parameter of a model file package locally stored in the terminal device and a parameter of a model file package managed by the server.

Optionally, before the terminal device receives the storage address of the target model file package from the server, the method further includes:

The terminal device obtains a parameter of the target model file package; and
    the terminal device sends a first request to the server based on the parameter of the target model file package. The first request is used to request the target model file package.

Optionally, that the terminal device obtains a parameter of the target model file package includes:

The terminal device receives parameters that are of K model file packages and that are sent by the server, where K is a positive integer; and
    the terminal device determines the parameter of the target model file package from the parameters of the K model file packages based on the parameter of the locally stored model file package.

Optionally, the parameter of the target model file package includes an identifier of the target model file package, the first request includes the identifier of the target model file package, and the identifier of the target model file package is used by the server to obtain the storage address of the target model file package.

Optionally, the parameter of the model file package includes a first-type parameter and a second-type parameter, and a matching priority of the first-type parameter is higher than a matching priority of the second-type parameter.

That the terminal device determines the parameter of the target model file package from the parameters of the K model file packages based on the parameter of the locally stored model file package includes:

When a first-type parameter of the locally stored model file package matches first-type parameters of N model file packages in the K model file packages, the terminal device determines the parameter of the target model file package based on a second-type parameter of the locally stored model file package and second-type parameters of the N model file packages, where N is a positive integer less than or equal to K.

Optionally, the second-type parameter includes a plurality of sub-parameters, and each sub-parameter has a different matching priority.

That the terminal device determines the parameter of the target model file package based on a second-type parameter of the locally stored model file package and second-type parameters of the N model file packages includes:

The terminal device matches the second-type parameter of the locally stored model file package with the second-type parameters of the N model file packages based on a matching priority sequence of the sub-parameters, to determine the parameter of the target model file package.

Optionally, before the terminal device receives the storage address of the target model file package from the server, the method further includes:

The terminal device obtains a parameter of a target model file:
    if the terminal device does not find the target model file in a locally stored mode) file based on the parameter of the target model file, the terminal device obtains, based on the parameter of the target model file, a parameter of a model file package to which the target model file belongs; and
    the terminal device sends a second request to the server. The second request includes the parameter of the model file package to which the target model file belongs, and the parameter of the model file package to which the target model file belongs is used by the server to determine the storage address of the target model file package.

Optionally, before the terminal device receives the storage address of the target model file package from the server, the method further includes:

The terminal device sends the parameter of the locally stored model file package to the server.

The parameter of the locally stored model file package is used by the server to determine the storage address of the target model file package.

Optionally, that the terminal device sends the parameter of the locally stored model file package to the server includes:

The terminal device receives a third request sent by the server, and the terminal device sends the parameter of the locally stored model file package to the server based on the third request; or
    the terminal device sends the parameter of the locally stored model file package to the server when determining that a condition for sending a parameter of a model file package is met.

Based on the method embodiments shown in FIG. 7 to FIG. 13, an embodiment of this application may provide a model file management method. The method may be performed by a server. Referring to S1401 and S1402 in FIG. 14, the model file management method may include the following steps:

The server obtains a storage address of a target model file package; and
    the server sends the storage address of the target model file package to a terminal device. The storage address is used by the terminal device to obtain the target model file package.

The target model file package is determined based on a parameter of a model file package locally stored in the terminal device and a parameter of a model file package managed by the server.

Optionally, before the server obtains the storage address of the target model file package, the method further includes:

The server receives a first request sent by the terminal device. The first request is used to request the target model file package.

Optionally, before the server receives the first request sent by the terminal device, the method further includes:

The server sends parameters of K model file packages managed by the server to the terminal device, where K is a positive integer. The parameters of the K model file packages are used by the terminal device to determine a parameter of the target model file package from the parameters of the K model file packages.

Optionally, the parameter of the target model file package includes an identifier of the target model file package, and the first request includes the identifier of the target model file package. That the server obtains a storage address of a target mode) file package includes: The server obtains the storage address of the target model file package based on the identifier of the target model file package.

Optionally, before the server obtains the storage address of the target model file package, the method further includes:

The server receives a second request sent by the terminal device. The second request includes a parameter of a model file package to which a target model file belongs.

That the server obtains a storage address of a target model file package includes:

The server determines, based on the parameter of the model file package to which the target model file belongs, a parameter of the target file package from parameters of K model file packages managed by the server; and the server obtains the storage address of the target model file package based on the parameter of the target file package.

Optionally, before the server obtains the storage address of the target model file package, the method further includes:

The server receives the parameter that is of the model file package locally stored in the terminal device and that is sent by the terminal device.

That the server obtains a storage address of a target model file package includes:

The server determines, based on the parameter of the locally stored model file package, a parameter of the target file package from parameters of K model file packages managed by the server; and the server obtains the storage address of the target model file package based on the parameter of the target file package.

Optionally, before the server receives the parameter that is of the model file package locally stored in the terminal device and that is sent by the terminal device, the method further includes:

The server sends a third request to the terminal device. The terminal device is used to request the parameter of the model file package locally stored in the terminal device.

Optionally, the parameter of the model file package includes a first-type parameter and a second-type parameter, and a matching priority of the first-type parameter is higher titan a matching priority of the second-type parameter.

That the server determines a parameter of the target model file package from parameters of the K model file packages based on the parameter that is of the model file package and that is received from the terminal device includes:

When a first-type parameter that is of the model file package and that is received from the terminal device matches first-type parameters of N model file packages in the K model file packages, the server determines the parameter of the target model file package based on a second-type parameter that is of the model file package and that is received from the terminal device and second-type parameters of the N model file packages, where N is a positive integer less than or equal to K.

Optionally, the second-type parameter includes a plurality of sub-parameters, and each sub-parameter has a different matching priority.

That the server determines the parameter of the target model file package based on a second-type parameter that is of the model file package and that is received from the terminal device and second-type parameters of the N model file packages includes:

The server matches the second-type parameter that is of the model file package and that is received from the terminal device with the second-type parameters of the N model file packages based on a matching priority sequence of the sub-parameters, to determine the parameter of the target model file package.

Figure 15:
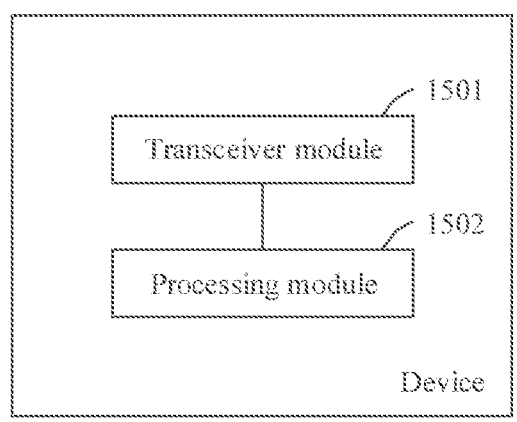
FIG. 15 is a structural diagram of a device according to an embodiment of this application.

FIG. 15 is a structural diagram of a device according to an embodiment of this application. The device provided in this embodiment may perform operations performed by the terminal device or the server in the foregoing method embodiments of this application. As shown in FIG. 15, the device provided in this embodiment may include a transceiver module 1501 and a processing module 1502.

When the device is a terminal device.

the transceiver module 1501 is configured to receive a storage address of a target model file package from a server; and the processing module 1502 is configured to obtain the target model file package based on the storage address of the target model file package.

The target model file package is determined based on a parameter of a model file package locally stored in the terminal device and a parameter of a model file package managed by the server.

When the device is a server, the processing module 1502 is configured to obtain a storage address of a target model file package; and the transceiver module 1501 is configured to send the storage address of the target model file package to a terminal device. The storage address is used by the terminal device to obtain the target model file package.

The target model file package is determined based on a parameter of a model file package locally stored in the terminal device and a parameter of a model file package managed by the server.

The transceiver module 1501 and the processing module 1502 may further perform other operations performed by the terminal device or the server in the foregoing method embodiments of this application. Technical principles and technical effects are similar. Details are not described herein again.

Figure 16:
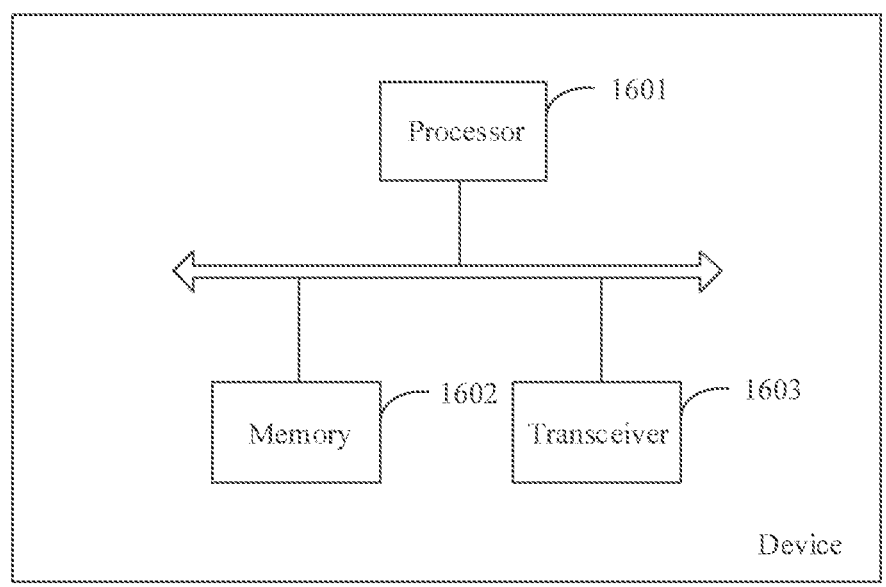
FIG. 16 is another structural diagram of a device according to an embodiment of this application.

FIG. 16 is another structural diagram of a device according to an embodiment of this application. The device provided in this embodiment may perform operations performed by the terminal device or the server in the foregoing method embodiments of this application. As shown in FIG. 16, the device provided in this embodiment may include a processor 1601, a memory 1602, and a transceiver 1603. The transceiver 1603 is configured to receive or send data. The memory 1602 is configured to store an instruction. The processor 1601 is configured to execute the instruction stored in the memory 1602 to perform operations performed by the terminal device or the server in the foregoing method embodiments of this application. Technical principles and technical effects are similar. Details are not described herein again.

Figure 17:
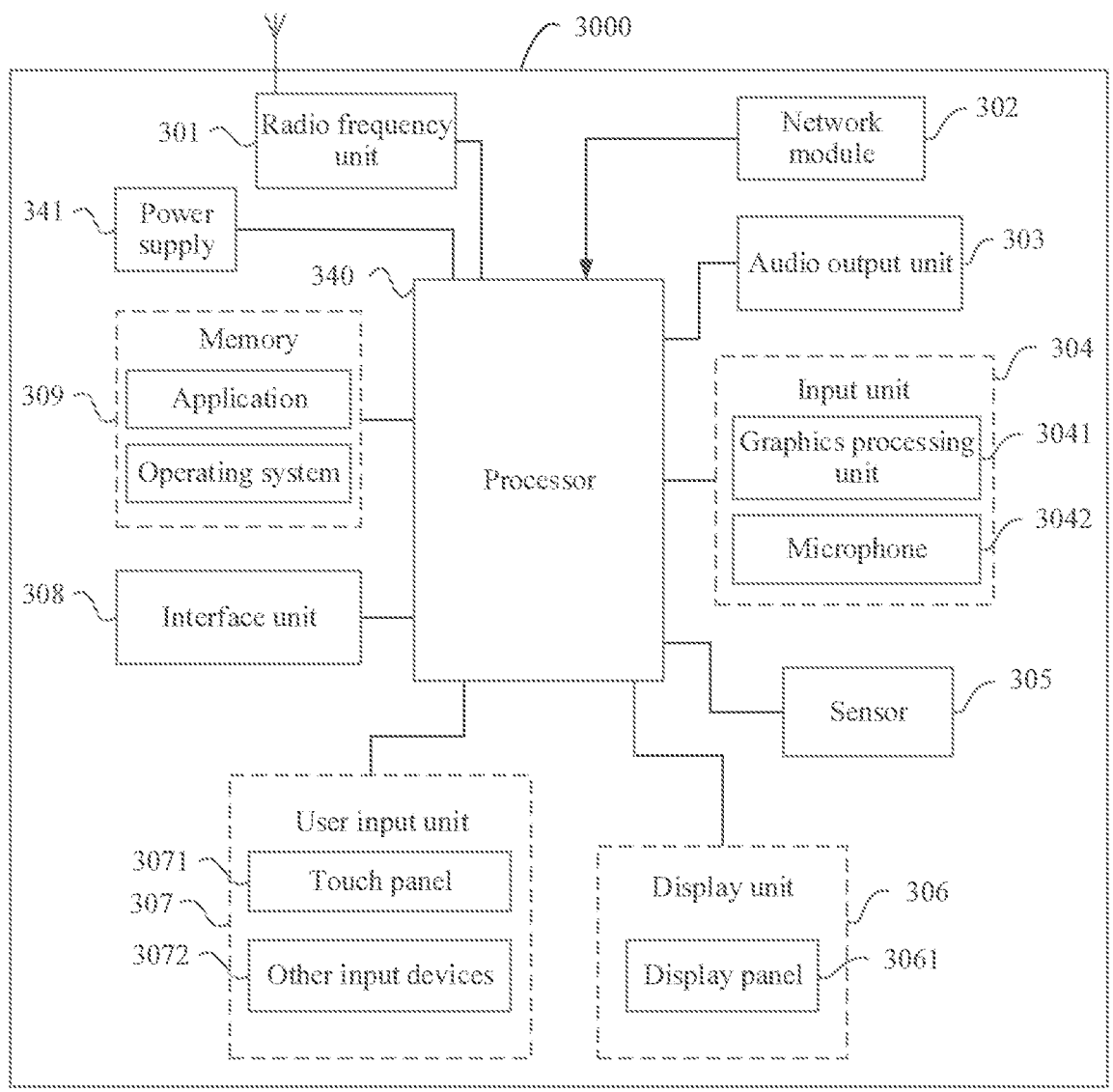
FIG. 17 is a structural diagram of hardware of a terminal device according to an embodiment of this application.

FIG. 17 is a structural diagram of hardware of a terminal device according to an embodiment of this application. As shown in FIG. 17, a terminal device 3000 includes but is not limited to components such as a radio frequency unit 301, a network module 302, an audio output unit 303, an input unit 304, a sensor 305, a display unit 306, a user input unit 307, an interface unit 308, a memory 309, a processor 340, and a power supply 341. It can be understood by a person skilled in the art that the terminal device structure shown in FIG. 17 constitutes no limitation on the terminal device, and the terminal device 3000 may include more or fewer components than those shown in the figure, or have some components combined, or have different component arrangements. In this embodiment of this application, the terminal device includes but is not limited to a mobile phone, a tablet computer, a palmtop computer, or the like.

The user input unit 307 is configured to receive user input. The display unit 306 is configured to display content based on the input in response to the input received by the user input unit 307.

It should be understood that in this embodiment of this application, the radio frequency unit 301 may be configured to receive and send a signal in an information receiving and sending process or in a call process. The radio frequency unit 301 usually includes but is not limited to an antenna, at least one amplifier, a transceiver, a coupler, a low noise amplifier, a duplexer, or the like. In addition, the radio frequency unit 301 may communicate with a network and another device by using a wireless communications system.

The terminal device 3000 provides wireless broadband internet access for a user by using the network module 302, for example, helps the user send and receive an email, browse a web page, and access streaming media.

The audio output unit 303 may convert audio data received by the radio frequency unit 301 or the network module 302 or stored in the memory 309 into an audio signal, and output the audio signal as a sound. In addition, the audio output unit 303 may provide audio output (such as a call signal receiving sound or a message receiving sound) related to a particular function executed by the terminal device 3000. The audio output unit 303 includes a speaker, a buzzer, a receiver, and the like.

The input unit 304 is configured to receive an audio or video signal. The input unit 304 may include a graphics processing unit (Graphics Processing Unit, GPU) 3041 and a microphone 3042. The graphics processing unit 3041 is configured to process image data of a picture or a video captured by a camera or the like. A processed image frame may be displayed on the display unit 306. The image frame processed by the graphics processing unit 3041 may be stored in the memory 309 (or another storage medium) or sent by using the radio frequency unit 301 or the network module 302. The microphone 3042 may receive a sound and can process such sound into audio data. The processed audio data may be converted, in a call mode, into a format that can be sent to a mobile communications base station by using the radio frequency unit 301 for output.

The terminal device 3000 further includes at least one sensor 305, for example, an optical sensor and a motion sensor. Specifically, the optical sensor includes an ambient light sensor and a proximity sensor. The ambient light sensor may adjust luminance of a display panel 3061 based on brightness of ambient light. The proximity sensor may turn off the display panel 3061 and/or backlight when the terminal device 3000 approaches an ear. As a type of motion sensor, an accelerometer sensor may detect a value of an acceleration in each direction (usually, three axes), may detect a value and a direction of gravity in a static state, and may be used in an application for identifying a posture of the terminal device (such as screen switching between a landscape mode and a portrait mode, a related game, or magnetometer posture calibration), a function related to vibration identification (such as a pedometer or a knock), and the like. The sensor 305 may further include a fingerprint sensor, a pressure sensor, an iris sensor, a molecular sensor, a gyroscope, a barometer, a hygrometer, a thermometer, an infrared sensor, and the like. Details are not described herein.

The display unit 306 may be configured to display information entered by the user or information provided for the user. The display unit 306 may include the display panel 3061. Optionally, the display panel 3061 may be configured in a form of a liquid crystal display (Liquid Crystal Display, LCD), an organic light-emitting diode (Organic Light-Emitting Diode, OLED), or the like.

The user input unit 307 may be configured to: receive entered digital information or character information, generate key signal input related to user settings and function control of the terminal device. Specifically, the user input unit 307 includes a touch panel 3071 and other input devices 3072. The touch panel 3071 is also referred to as a touchscreen, and may collect a touch operation performed by the user on or near the touch panel (for example, an operation performed by the user on the touch panel 3071 or near the touch panel 3071 by using any proper object or accessory such as a finger or a stylus). The touch panel 3071 may include two parts: a touch detection apparatus and a touch controller. The touch detection apparatus detects a touch orientation of the user, detects a signal brought by a touch operation, and transfers the signal to the touch controller. The touch controller receives touch information from the touch detection apparatus, converts the touch information into coordinates of a touch point, sends the coordinates to the processor 340, and receives and executes a command sent by the processor 340. In addition, the touch panel 3071 may be implemented by using a plurality of types such as a resistive type, a capacitive type, an infrared type, and a surface acoustic wave type. The user input unit 307 may include the other input devices 3072 in addition to the touch panel 3071. Specifically, the other input devices 3072 may include but are not limited to a physical keyboard, a functional button (such as a volume control button or an on/off button), a trackball, a mouse, a joystick, and the like. Details are not described herein.

Further, the touch panel 3071 may cover the display panel 3061. When detecting a touch operation on or near the touch panel 3071, the touch panel 3071 transfers the touch operation to the processor 340 to determine a type of a touch event. The processor 340 then provides corresponding visual output on the display panel 3061 based on the type of the touch event. The touch panel 3071 and the display panel 3061 in FIG. 17 are used as two independent components to implement input and output functions of the terminal device. However, in some embodiments, the touch panel 3071 and the display panel 3061 may be integrated to implement the input and output functions of the terminal device. This is not specifically limited herein.

The interface unit 308 is an interface for connecting an external apparatus and the terminal device 3000. For example, the external apparatus may include a wired or wireless headphone port, an external power supply (or a battery charger) port, a wired or wireless data port, a memory card port, a port used to connect to ail apparatus that includes an identification module, an audio input/output (I/O) port, a video I/O port, or a headset port. The interface unit 308 may be configured to: receive input (for example, data information and power) from an external apparatus, and transmit the received input to one or more elements in the terminal device 3000, or may be configured to transmit data between the terminal device 3000 and the external apparatus.

The memory 309 may be configured to store a software program and various types of data. The memory 309 may mainly include a program storage area and a data storage area. The program storage area may store an operating system, an application required by at least one function (such as a sound play function or an image play function), and the like. The data storage area may store data (such as audio data or an address book) created based on use of terminal device, and the like. In addition, the memory 309 may include a high-speed random access memory, and may further include a nonvolatile memory such as at least one magnetic disk storage device, a flash storage device, or another volatile solid-state storage device.

The processor 340 is a control center of the terminal device, is connected to all parts of the entire terminal device by using various interfaces and lines, and performs various functions of the terminal device and data processing by running or executing the software program and/or a module that are/is stored in the memory 309 and by invoking data stored in the memory 309, to perform overall monitoring on the terminal device. The processor 340 may include one or more processing units. Optionally, an application processor and a modem processor may be integrated into the processor 340. The application processor mainly processes an operating system, a user interface, an application, and the like. The modem processor mainly processes wireless communications. It may be understood that the modem processor may not be integrated into the processor 340.

Referring to FIG. 17, in this embodiment of this application, the memory 309 stores a computer program, and the processor 340 runs the computer program, so that the terminal device performs operations performed by the terminal device in the foregoing method embodiments.

In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of this application. The general-purpose purpose processor may be a microprocessor, any conventional processor, or the like. The steps of the method disclosed with reference to the embodiments of this application may be directly performed by a hardware processor, or may be performed by using a combination of hardware in the processor and a software module.

In this embodiment of this application, the memory may be a nonvolatile memory such as a hard disk drive (hard disk drive, HDD) or a solid-state drive (solid-state drive, SSD), or may lie a volatile memory (volatile memory) such as a random access memory (random-access memory, RAM), lire memory is any other medium that can carry or store expected program code in a form of an instruction or a data structure and that can be accessed by a computer, but is not limited thereto. The memory in this embodiment of this application may alternatively be a circuit or any other apparatus that can implement a storage function, and is configured to store a program instruction and/or data.

What is claimed is:

1. A method implemented by a terminal device, wherein the method comprises:
   obtaining a first parameter of a target model file package from among K second parameters, based on a second-type parameter of a first model file package and second-type parameters of N model file packages in K model packages, when a first-type parameter of the first model file package matches first-type parameters of N model file packages, wherein K is a positive integer, and wherein N is a positive integer less than or equal to K;
   sending, based on the first parameter, a first request requesting the target model file package to a server, wherein the first parameter comprises an identifier of a target model file package;
   receiving, in response to the first request, a storage address of the target model file package from the server, wherein the target model file package is based on a third parameter of a first model file package locally stored in the terminal device and a fourth parameter of a second model file package of the server, wherein each of the first parameter, the second parameter, the third parameter, and the fourth parameters comprises a first-type parameter and a second-type parameter, and wherein a first matching priority of the first-type parameter is higher than a second matching priority of the second-type parameter; and
   obtaining the target model file package based on the storage address.

2. The method of claim 1, wherein each second-type parameter comprises a plurality of sub-parameters, wherein each of the sub-parameters has a different matching priority, and wherein the method further comprises matching the second-type parameter of the first model file package with the second-type parameters of the N model file packages based on a matching priority sequence of the sub-parameters to determine the third first parameter.

3. The method of claim 1, wherein before receiving the storage address, the method further comprises:
   obtaining, when the target model file is not in the locally stored model file, and based on the first parameter, a second parameter of a third model file package to which the target model file belongs; and
   sending a second request comprising the second parameter to the server to determine the storage address.

4. The method of claim 1, further comprising:
   receiving a second request from the server; and
   further sending, based on the second request, the first parameter to the server.

5. The method of claim 1, further comprising the first parameter to the server when a condition for sending a first parameter of a third model file package is met.

6. The method of claim 1, wherein the transceiver is further configured to further send the first parameter to the server when a condition for sending a first parameter of a third model file package is met.

7. The method of claim 6, wherein the condition comprises the lapse of a preset period for updating.

8. The method of claim 6, wherein the condition comprises when the terminal device detects that a current wireless network connection is a wireless local area network (WLAN).

9. A terminal device comprising:
   a transceiver configured to communicate with a server; and
   a processor coupled to the transceiver and configured to:
      obtain a first parameter of a target model file package from among K second parameters, based on a second-type parameter of a first model file package and second-type parameters of N model file packages in K model packages, when a first-type parameter of the first model file package matches first-type parameters of N model file packages, wherein K is a positive integer, and wherein N is a positive integer less than or equal to K;

cause the transceiver to send, based on the first parameter, a first request requesting the target model file package to a server, wherein the first parameter comprises an identifier of a target model file package;

receive from the transceiver, in response to the first request, a storage address of the target model file package from the server, wherein the target model file package is based on a third parameter of a first model file package locally stored in the terminal device and a fourth parameter of a second model file package of the server, wherein each of the first parameter, the second parameter, the third parameter, and the fourth parameters comprises a first-type parameter and a second-type parameter, and wherein a first matching priority of the first-type parameter is higher than a second matching priority of the second-type parameter; and obtain the target model file package based on the storage address.

10. The terminal device of claim 9, wherein each second-type parameter comprises a plurality of sub-parameters, wherein each of the sub-parameters has a different matching priority, and wherein the processor is further configured to match the second-type parameter of the first model file package with the second-type parameters of the N model file packages based on a matching priority sequence of the sub-parameters to determine the first third parameter.

11. The terminal device of claim 9, wherein the processor is further configured to:

obtain, when the target file is not located in a locally stored model file of the terminal device, and based on the first parameter, a second parameter of a third model file package to which the target model file belongs, and wherein the transceiver is further configured to send a second request comprising the second fourth parameter to the server to determine the storage address.

12. The terminal device of claim 9, wherein the transceiver is further configured to receive a second request from the server and further send, based on the second request, the first parameter to the server.

13. The terminal device of claim 9, wherein the transceiver is further configured to further send the first parameter to the server when a condition for sending a first parameter of a third model file package is met.

14. The terminal device of claim 13, wherein the condition comprises the lapse of a preset period for updating.

15. A computer program product comprising computer-executable instructions stored on a non-transitory computer-readable storage medium that, executed by a processor, cause an apparatus to:

obtain a first parameter of a target model file package from among K second parameters, based on a second-type parameter of a first model file package and second-type parameters of N model file packages in K model file packages, when a first-type parameter of the first model file package matches first-type parameters of N model file packages, wherein K is a positive integer, and wherein N is a positive integer less than or equal to K;

send, based on the first parameter, a first request requesting the target model file package to a server, wherein the first parameter comprises an identifier of a target model file package;

receive, in response to the first request, a storage address of the target model file package from the server, wherein the target model file package is based on a third parameter of a first model file package locally stored in the terminal device and a fourth parameter of a second model file package of the server, wherein each of the first parameter, the second parameter, the third parameter, and the fourth parameters comprises a first-type parameter and a second-type parameter, and wherein a first matching priority of the first-type parameter is higher than a second matching priority of the second-type parameter; and obtain the target model file package based on the storage address.

16. The computer program product of claim 15, wherein each second-type parameter comprises a plurality of sub-parameters, wherein each of the sub-parameters has a different matching priority, and wherein the computer-executable instructions, when executed by a processor, cause the apparatus to match the second-type parameter of the first model file package with the second-type parameters of the N model file packages based on a matching priority sequence of the sub-parameters to determine the third parameter.

17. The computer program product of claim 15, wherein the computer-executable instructions, when executed by a processor, cause the apparatus to:

obtain, when the target model file is not located in a locally stored model file of the terminal device, and based on the first parameter, a second parameter of a third model file package to which the target model file belongs, and wherein the transceiver is further configured to send a second request comprising the second parameter to the server to determine the storage address.

18. The computer program product of claim 15, wherein the computer-executable instructions, when executed by a processor, cause the apparatus to receive a second request from the server and further send, based on the second request, the first parameter to the server.

19. The computer program product of claim 15, wherein the computer-executable instructions, when executed by a processor, cause the apparatus to further send the first parameter to the server when a condition for sending a first parameter of a third model file package is met.

20. The computer program product of claim 19, wherein the condition comprises the lapse of a preset period for updating.

* * * * *